US010896447B1

(12) United States Patent
Cohen et al.

(10) Patent No.: US 10,896,447 B1
(45) Date of Patent: Jan. 19, 2021

(54) METHODS AND SYSTEMS FOR REDUCING INADVERTENT INTERACTIONS WITH ADVERTISEMENTS DISPLAYED ON A COMPUTING DEVICE

(71) Applicant: Google LLC, Mountain View, CA (US)

(72) Inventors: Brian Scot Cohen, Mountain View, CA (US); Lloyd Dee Thompson, Mountain View, CA (US); Armen Mkrtchyan, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1010 days.

(21) Appl. No.: 14/744,846

(22) Filed: Jun. 19, 2015

(51) Int. Cl.
*G06Q 30/02* (2012.01)
*G06F 3/0488* (2013.01)
*G06F 3/0484* (2013.01)

(52) U.S. Cl.
CPC ....... *G06Q 30/0277* (2013.01); *G06F 3/0488* (2013.01); *G06F 3/04842* (2013.01)

(58) Field of Classification Search
None
See application file for complete search history.

(56) References Cited

U.S. PATENT DOCUMENTS

| | | | | |
|---|---|---|---|---|
| 9,275,016 | B1* | 3/2016 | Freund | G06F 17/211 |
| 2009/0063262 | A1* | 3/2009 | Mason | G06Q 30/0256 |
| | | | | 705/14.54 |
| 2011/0288913 | A1 | 11/2011 | Waylonis et al. | |
| 2012/0101907 | A1* | 4/2012 | Dodda | G06Q 30/0277 |
| | | | | 705/14.73 |
| 2013/0085858 | A1 | 4/2013 | Sim et al. | |
| 2013/0211923 | A1* | 8/2013 | Yuill | G06Q 30/0276 |
| | | | | 705/14.72 |
| 2014/0046766 | A1* | 2/2014 | Klanjsek | G06Q 30/02 |
| | | | | 705/14.64 |
| 2014/0095328 | A1 | 4/2014 | Forouzandeh et al. | |
| 2014/0316884 | A1 | 10/2014 | Munisamy | |
| 2015/0074072 | A1* | 3/2015 | Jain | G06F 17/30696 |
| | | | | 707/706 |

OTHER PUBLICATIONS

International Search Report & Written Opinion on PCT/US2016/037440 dated Aug. 18, 2016.

(Continued)

*Primary Examiner* — Alexandru Cirnu
(74) *Attorney, Agent, or Firm* — Foley & Lardner LLP

(57) ABSTRACT

A computing device can receive an interactive advertisement comprising a first content object and a second content object. The computing device can display the first content object corresponding to a collapsed version of the interactive advertisement. The computing device can receive a first action to activate the interactive advertisement. The computing device can provide for display, responsive to receiving the first action, a target object identifying a location on the display screen to which to move the first content object. The computing device can receive a second action to move the first content object towards the target object. The computing device can then provide for display, the second content object corresponding to an expanded version of the interactive ad on the display screen of the computing device.

20 Claims, 25 Drawing Sheets

(56) References Cited

OTHER PUBLICATIONS

IAB Mobile Slider searched via online internet at http://test.adform.com/testpage/banner-specifications/iab-mobile-rising-star/iab-mobile-slider/ on Jan. 26, 2015.

Phluant: Dojo, the mobile ad serving platform, searched via online web at http://www.phluant.com/ on Jan. 26, 2014.

Picard: AdExchanger: Time for a New Mobile Ad Format searched via online at http://adexchanger.com/data-driven-thinking/mobile-ad-format/ dated Nov. 19, 2012.

Vale, Amy: Swipe Your Way to Successful Mobile Ads, via online internet at http://blog.mojiva.com/2012/05/swipe-your-way-to-successful-mobile-ads.html, Searched on Jan. 23, 2015.

Vantage Local Announces Launch of Swipe-to-Engage Mobile Ad Unit; searched via online at http://www.vantagelocal.com/vantage-local-announces-launch-of-swipe-to-engage-mobile-ad-unit/ on Jan. 23, 2015.

Final Office Action on U.S. Appl. No. 14/744,854, dated Jul. 6, 2018.

Non-Final Office Action on U.S. Appl. No. 14/744,854, dated Dec. 26, 2018.

U.S. Office Action on U.S. Appl. No. 14/744,854, dated Dec. 11, 2017.

\* cited by examiner

Weather.com

5pm, 61F and cloudy

`<script type="text/javascript" src="//pagead2.googlesyndication.com/pagead/show_ads.js">`
`</script>`

Weather.com

5pm, 61F and cloudy

`<script type="text/javascript" src="//pagead2.googlesyndication.com/pagead/show_ads.js">`
`</script>`

// BEGIN CONTENT ADDED TO THE DOM BY SHOW_ADS

// show_ads.js loads expansion_embed.js into the browser from Google servers
  `<script async="" type="text/javascript"`
   `src="http://pagead2.googlesyndication.com/.../expansion_embed.js">`
  `</script>`
  // The iframe is the ad container
  `<iframe id="google_ads_frame1">`
   // The content inside the iframe is the ad itself
   ...
  `</iframe>`
  ...
// END CONTENT ADDED TO THE DOM BY SHOW_ADS

Weather.com

5pm, 61F and cloudy

`<script type="text/javascript" src="//pagead2.googlesyndication.com/pagead/show_ads.js">`
`</script>`

// BEGIN CONTENT ADDED TO THE DOM BY SHOW_ADS

// show_ads.js loads expansion_embed.js into the browser from Google servers
  `<script type="text/javascript"`
   `src="http://pagead2.googlesyndication.com/.../expansion_embed.js">`
  `</script>`
  // The iframe is the ad container
  `<iframe id="google_ads_frame1">`
   // The content inside the iframe is the ad itself
   `<script type="text/javascript"`
    `src="http://pagead2.googlesyndication.com/.../expansion_embed.js">`
   ...
  `</iframe>`
// END CONTENT ADDED TO THE DOM BY SHOW_ADS

FIG. 6C

Weather.com

5pm, 61F and cloudy

```
<script type="text/javascript" src="//pagead2.googlesyndication.com/pagead/show_ads.js">
</script>
// BEGIN CONTENT ADDED TO THE DOM BY SHOW_ADS
...
  // show_ads.js loads expansion_embed.js into the browser from Google servers
  <script type="text/javascript"
    src="http://pagead2.googlesyndication.com/.../expansion_embed.js">
  </script>
  // These are example elements the expansion library might add to the
  // publisher page for use in swipe to expand.
  <div id="background_overlay"></div>
  <div id="swipe_target"></div>
  <div id="ad_iframe_overlay"></div>
  // The iframe is the ad container
  <iframe id="google_ads_frame1">
    // The content inside the iframe is the ad itself
    <script type="text/javascript"
      src="http://pagead2.googlesyndication.com/.../expansion_embed.js">
    ...
  <iframe>
...
// END CONTENT ADDED TO THE DOM BY SHOW_ADS
```

FIG. 6F

METHODS AND SYSTEMS FOR REDUCING INADVERTENT INTERACTIONS WITH ADVERTISEMENTS DISPLAYED ON A COMPUTING DEVICE

BACKGROUND

In a computer networked environment such as the internet, third-party content providers provide third-party content items for display on end-user computing devices. These third-party content items, for example, advertisements, can be linked to web pages associated with the third-party content providers. These third-party content items can include content identifying the third-party content provider that provided the content item.

SUMMARY

According to one aspect, a method of reducing low quality interactions with advertisements displayed on a computing device is described. Low quality interactions with ads may occur due to inadvertent clicks, taps or other actions that result in an interaction with ads. In addition, a low quality interaction with an ad may result from a user taking an action on the ad and realizing that the ad is misleading after viewing a landing page or destination of the ad.

A computing device can receive an interactive advertisement comprising a first content object and a second content object. The computing device can display the first content object corresponding to a collapsed version of the interactive advertisement. The computing device can receive a first action to activate the interactive advertisement. The computing device can then provide for display, responsive to receiving the first action, a target object identifying a location on the display screen to which to move the first content object. In some implementations, the target object can identify a path on the display screen along which to move the target object. The target object provided for display on a portion of the display screen of the computing device based on a location of the first content object on the display screen. The computing device can receive a second action to move the first content object towards the target object. The computing device can then provide for display, responsive to determining that the second action to move the first content object towards the target object satisfies a triggering event, the second content object corresponding to an expanded version of the interactive ad on the display screen of the computing device.

In some implementations, the first action corresponds to a touch on a display screen and the second action corresponds to a swipe gesture. In some implementations, the first action corresponds to a touch for a time period greater than a predetermined length of time.

In some implementations, providing, for display, the target object to which to move the first content object includes determining at least one coordinate pair of pixels corresponding to a first edge of the first content object and an identity of the first edge of the first content object and determining, based on the at least one coordinate pair of pixels and the first edge of the first content object, a second coordinate pair at which to position a second edge of the target object.

In some implementations, the computing device can display the target object in a first appearance when a distance from the first edge of the first content object to a corresponding edge of the target object is greater than a predetermined distance and display the target object in a second appearance when the distance from the first edge of the first content object to the corresponding edge of the target object is less than a predetermined distance from the corresponding edge of the target object.

In some implementations, the computing device can receive, via the display screen of the computing device, an input indicative of initiating the second action to move the first content object from an original location towards the target object. The computing device can then provide, for display, a visual indicator indicating that the expanded version of the interactive ad will be displayed on the display screen of the computing device upon terminating the second action.

In some implementations, responsive to receiving the second action to move the first content object towards the target object, the computing device can increase the opacity of the overlay provided over the information resource displayed on the computing device.

In some implementations, the computing device can determine a location to position the target object based on at least one of a size of the first content object, a current location of the first content object on the display, a size of the target object and a size of the display.

In some implementations, the computing device can provide, for display, a call to action indicating a manner in which to expand the collapsed version of the ad to the expanded version of the ad.

At least one aspect is directed to a method for reducing low quality conversions on a content item. A data processing system including one or more processors receives a request to display, on a display screen of a computing device, content in an ad slot of an information resource. The data processing system provides for display, an interactive advertisement in response to the request to display content, the interactive advertisement including a first content object, a second content object and a script executable by the one or more processors of the computing device. The script is configured to cause one or more processors of the computing device to i) display, on the display screen of the computing device, the first content object corresponding to a collapsed version of the interactive advertisement, ii) receive, by the computing device, a first action to activate the interactive advertisement, iii) provide for display, responsive to receiving the first action, a target object identifying a location on the display screen to which to move the first content object, the target object provided for display on a portion of the display screen of the computing device based on a location of the first content object on the display screen, iv) receive, by the computing device, a second action to move the first content object towards the target object, and v) provide for display, responsive to determining that the second action to move the first content object towards the target object satisfies a triggering event, the second content object corresponding to an expanded version of the interactive ad on the display screen of the computing device.

Another aspect is directed to a system for reducing low quality conversions on a content item, comprising a computing device including one or more processors, a memory and a display screen. The computing device is configured to receive an interactive advertisement comprising a first content object and a second content object. The computing device is configured to display the first content object corresponding to a collapsed version of the interactive advertisement. The computing device is configured to receive a first action to activate the interactive advertisement. The computing device is configured to provide for display, responsive to receiving the first action, a target object identifying a location on the display screen to which to move the first content object, the target object provided for display on a portion of the display screen of the computing device based on a location of the first content object on the display screen. The computing device is configured to receive, by the computing device, a second action to move the first content object towards the target object. The computing device is configured to provide for display, responsive to determining that the second action to move the first content object towards the target object satisfies a triggering event, the second content object corresponding to an expanded version of the interactive ad on the display screen of the computing device.

According to another aspect, a method for providing interactive advertisements is described. A computing device including one or more processors can provide, for display, a first content object of an interactive advertisement in a content slot of an information resource. The interactive ad can include a second content object configured for display responsive to a first predetermined gesture on the first content object. The computing device can identify a region defined by one or more boundaries of the content slot. The computing device can receive, via a touchscreen interface of the computing device, an action performed on the touchscreen interface that is initiated in an area of the touchscreen interface that corresponds to the identified region defined by one or more boundaries of the content slot. The computing device can determine that the action corresponds to the first predetermined gesture and provide for display, responsive to determining that the action corresponds to a first predetermined gesture, the second content object instead of the first content object.

In some implementations, responsive to determining that the action corresponds to a second predetermined gesture, the computing device can remove the first content object from display. In some implementations, the first predetermined gesture is a right swipe and the second predetermined gesture is a left swipe.

In some implementations, the interactive advertisement includes a first interactive ad. The computing device can responsive to determining that the action corresponds to a second predetermined gesture, remove from display the first content object and provide a content object of a second interactive advertisement.

In some implementations, the computing device can responsive to determining that the action corresponds to a second predetermined gesture, provide, for display, in the content slot, a content item including a plurality of selectable options. The processor can receive a selection of one of the selectable options and provide, based on the selection, information to an advertisement selection system, the advertisement selection system configured to use the information to select subsequent advertisements for display on the computing device. In some implementations, the computing device can responsive to determining that the action corresponds to a second predetermined gesture, remove the content slot from the displayed information resource and adjust a position of at least a portion of the primary content of the information resource to be displayed in a region of the information resource previously occupied by the content slot.

In some implementations, the information resource is a page displayed on one of a browser or a native application installed on the computing device. The information resource can include one or more primary content items provided by a content publisher of the information resource. In some implementations, providing for display, the second content object instead of the first content object includes providing for display, the second content object as an overlay over the information resource. In some implementations, the computing device can determine that the action is initiated in the area of the touchscreen interface that corresponds to the identified region defined by one or more boundaries of the content slot.

According to another aspect, a system for providing interactive advertisements includes a computing device including one or more processors, a memory and a display screen. The computing device is configured to provide, for display, on the display screen, a first content object of an interactive advertisement in a content slot of an information resource. The interactive ad can include a second content object configured for display responsive to a first predetermined gesture on the first content object. The computing device is configured to identify a region defined by one or more boundaries of the content slot. The computing device is configured to receive, via the display screen, an action performed on the touchscreen interface that is initiated in an area of the touchscreen interface that corresponds to the identified region defined by one or more boundaries of the content slot. The computing device is configured to determine that the action corresponds to the first predetermined gesture. The computing device is configured to provide for display, responsive to determining that the action corresponds to a first predetermined gesture, the second content object instead of the first content object.

In some implementations, responsive to determining that the action corresponds to a second predetermined gesture, the computing device can remove the first content object from display. In some implementations, the first predetermined gesture is a right swipe and the second predetermined gesture is a left swipe.

In some implementations, the interactive advertisement includes a first interactive ad. The computing device can responsive to determining that the action corresponds to a second predetermined gesture, remove from display the first content object and provide a content object of a second interactive advertisement.

In some implementations, the computing device can responsive to determining that the action corresponds to a second predetermined gesture, provide, for display, in the content slot, a content item including a plurality of selectable options. The processor can receive a selection of one of the selectable options and provide, based on the selection, information to an advertisement selection system, the advertisement selection system configured to use the information to select subsequent advertisements for display on the computing device. In some implementations, the computing device can responsive to determining that the action corresponds to a second predetermined gesture, remove the content slot from the displayed information resource and adjust a position of at least a portion of the primary content of the information resource to be displayed in a region of the information resource previously occupied by the content slot.

In some implementations, the information resource is a page displayed on one of a browser or a native application installed on the computing device. The information resource can include one or more primary content items provided by a content publisher of the information resource. In some implementations, providing for display, the second content object instead of the first content object includes providing for display, the second content object as an overlay over the information resource. In some implementations, the computing device can determine that the action is initiated in the area of the touchscreen interface that corresponds to the identified region defined by one or more boundaries of the content slot.

According to yet another aspect, a method for providing interactive advertisements is described. A data processing system including one or more processors can receive a request to display, on a display screen of a computing device, content in an ad slot of an information resource. The data processing system can provide, for display, by the data processing system, an interactive advertisement in response to the request to display content. The interactive advertisement can include a first content object, a second content object and a script executable by the one or more processors of the computing device. The script can be configured to cause one or more processors of the computing device to display, on the display screen, the first content object of an interactive advertisement in a content slot of an information resource; identify a region defined by one or more boundaries of the ad slot; receive an action performed on the display screen that is initiated in an area of the display screen that corresponds to the identified region defined by one or more boundaries of the ad slot; determine that the action corresponds to the first predetermined gesture; and provide for display, responsive to determining that the action corresponds to a first predetermined gesture, the second content object instead of the first content object.

In some implementations, responsive to determining that the action corresponds to a second predetermined gesture, the script can cause the computing device to remove the first content object from display.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIGS. 6A-6F show blocks that include software code and comments for execution on a browser of a computing device on which to display one or more interactive ads, according to an illustrative implementation;

DETAILED DESCRIPTION

Figure 1:
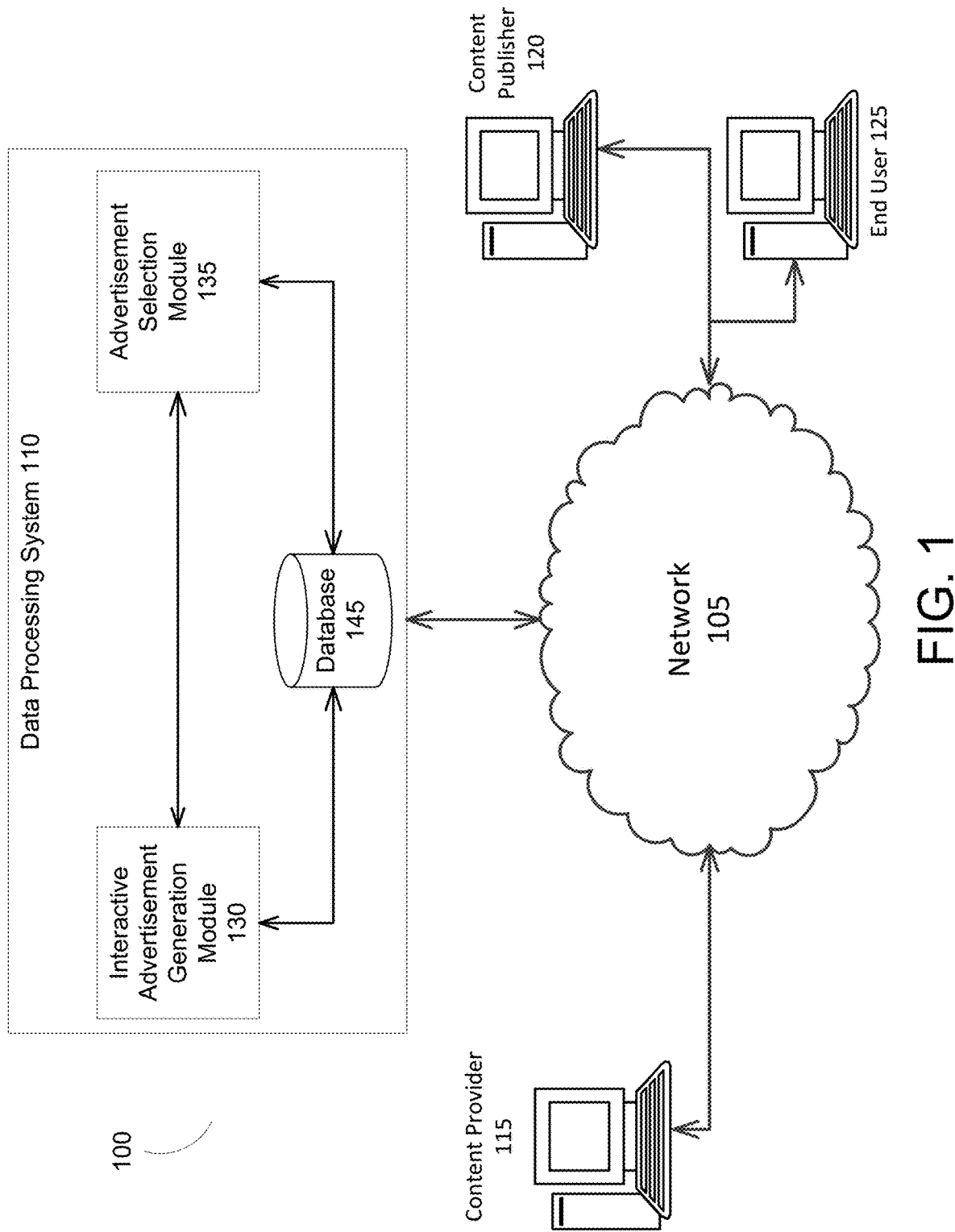
FIG. 1 is a block diagram depicting one implementation of an environment for reducing low quality conversions of advertisements, according to an illustrative implementation.

Following below are more detailed descriptions of various concepts related to, and implementations of, methods, apparatuses, and systems of reducing inadvertent or low quality clicks or taps of advertisements displayed on a computing device, such as a computing device, in a computer network environment. The various concepts introduced above and discussed in greater detail below may be implemented in any of numerous ways, as the described concepts are not limited to any particular manner of implementation.

According to one aspect, the present disclosure relates to an improved interactive advertisement that is designed to reduce the number of low quality conversions of ads based on inadvertent actions. In particular, the interactive advertisement can include a first content item corresponding to a collapsed version of the interactive advertisement and a second content item corresponding to an expanded version of the interactive advertisement. The interactive ad can reduce the number of low quality conversions by requiring a user of a computing device to move the first content item displayed at a first location on a display screen of the computing device to a target location provided at a second location of the display screen. Upon the first content item being moved to the target location, the second content item corresponding to the expanded version of the interactive advertisement is displayed on the mobile screen. The target location can be located at any region of the display screen. In some implementations, the target location can be located at a region of the display screen that is outside of the boundary of the ad slot within which the first content item is displayed.

In some implementations, a first content item corresponding to a collapsed version of the interactive ad is displayed in an ad slot on a display screen of a computing device. In response to detecting a first action on the interactive ad, the computing device on which the interactive ad is displayed is configured to display a target displayed somewhere else on the display screen. In some implementations, the first action can be a touch, a click, tap, double click or double tap. In some implementations, the first action can be a touch that exceeds a predetermined time threshold, for example, 20 ms. In response to detecting a second action that moves the first content item to the displayed target, the computing device displays an expanded version of the interactive ad. In some implementations, the expanded version of the interactive ad is a floating ad that extends outside the boundary of the ad slot.

In some implementations, as the first content item is dragged from its initial position to the target, the browser executing on the computing device can be configured to dim the content provided on the information resource by the content publisher on which the interactive ad is displayed. In some implementations, as the first content item is dragged from its initial position to the target, the computing device provides a visual indicator for display. The visual indicator can include a first state indicating that upon releasing the first content item, the first content item will return to the initial position and no conversion will take place or a second state indicating that upon releasing the first content item, the first content item will be advanced to the target and a conversion will take place causing the expanded version of the interactive ad to display. In some implementations, as the first content item is dragged from the initial position to the target, a preview of the expanded version of the interactive ad may appear over the publisher's content to allow the user to get a preview of the ad before the action actually counts as a conversion or before an expansion of the ad actually occurs. In some implementations, as the first content item is dragged from the initial position to the target, a visual indicator indicative of an expand feature may be displayed. The visual indicator can include diagonal outward arrows, for instance. In some implementations, the visual indicator can include an expanding circle or rectangle.

In some implementations, a swipe may not be complete until the user releases the first content object, for example, by lifting their finger. Once the swipe is complete, the ad is either expanded or remains in its original position. When deciding whether to expand on the completion of the swipe, a processing circuit may identify a distance the ad traveled between its initial position and planned target position (which it would have reached if the user swiped all the way to the target). The processing circuit may also consider a speed and/or direction at which the swipe occurred to best interpret the user's desired behavior. If, during the swipe, the ad reaches a point where the ad will expand upon the user releases the ad, the processing circuit will provide visual feedback that the ad has crossed that threshold. In some implementations, the processing circuit may display the second content regardless of whether the user releases the first content object. Additionally, the ad itself may further change state throughout the swipe to reflect that it is expanding as a result of the swipe.

In addition to simply providing a target to which to drag the ad, the computing device can determine where to place the target on the screen. That decision can be made at touch-start (when a user first touches a portion of the ad slot) immediately before displaying the target. Factors, such as the viewport size, the ad size, the current location of the ad slot, and the size of the target are considered when determining where to place the target on the screen.

It should be appreciated that there is an emotional component to this ad expansion concept. Users may find dragging an ad to a target somewhat satisfying. Perhaps a user who was blind to the ad before will notice it once they start to drag it around. In addition, the ad expansion concept can provide the user a feeling of being in control during the drag motion—in particular, the user is able to let go of the content item early on in the drag motion to avoid expansion or continue dragging the content item towards the target to cause the ad to expand. This sense of control is non-existent in a classic tap or click to open, which is an instant event. Furthermore, the target can be branded to provide additional value or an opportunity to break through ad blindness. If the user is surprised by the target, the user may simply lift their finger or otherwise end the action and the target will disappear. This solution provides opportunities for additional advertiser branding (a branded target), combats ad-blindness, puts the user in control, previews some elements of the expanded experience (the ad takes over front and center and the publisher content is obscured), and gets the user comfortable with swiping. It should be appreciated that this concept can be expanded to other content engagement mechanisms. For instance, "swipe to collapse," "swipe to collapse exit surveys," among others. The present disclosure also allows the target to be positioned anywhere outside of the ad slot thereby no longer limiting any ad related interaction to portions within the ad slot.

In some implementations, different criteria may be used to determine if a user swipe should result in an expansion or not. In some implementations, multi-touch gestures or swipes rather than a single finger swipe may be used. In some implementations, other gestures may be used to provide a way to dismiss the ads for example, a swipe right gesture or a pinch-in gesture from corners of the ad may be reserved to dismiss ads.

FIG. 1 is a block diagram depicting one implementation of an environment for reducing low quality conversions of advertisements, according to an illustrative implementation. The environment 100 includes at least one data processing system 110. The data processing system 110 can include at least one processor and a memory, i.e., a processing circuit. The memory stores processor-executable instructions that, when executed by processor, cause the processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language. The data processing system can include one or more computing devices or servers that can perform various functions. In some implementations, the data processing system can include an advertising auction system configured to host auctions. In some implementations, the data processing system does not include the advertising auction system but is configured to communicate with the advertising auction system via the network 105.

The network 105 can include computer networks such as the internet, local, wide, metro or other area networks, intranets, satellite networks, other computer networks such as voice or data mobile phone communication networks, and combinations thereof. The data processing system 110 of the system 100 can communicate via the network 105, for instance with at least one content provider computing device 115, at least one content publisher computing device 120, or at least one end user computing device 125. The network 105 may be any form of computer network that relays information between the user computing device 115, data processing system 110, and one or more content sources, for example, web servers, advertising servers, amongst others. For example, the network 105 may include the Internet and/or other types of data networks, such as a local area network (LAN), a wide area network (WAN), a cellular network, satellite network, or other types of data networks. The network 105 may also include any number of computing devices (e.g., computer, servers, routers, network switches, etc.) that are configured to receive and/or transmit data within network 105. The network 105 may further include any number of hardwired and/or wireless connections. For example, the user computing device 115 may communicate wirelessly (e.g., via WiFi, cellular, radio, etc.) with a transceiver that is hardwired (e.g., via a fiber optic cable, a CAT5 cable, etc.) to other computing devices in network 105.

The content provider computing devices 115 can include servers or other computing devices operated by a content provider entity to provide content items such as advertisements for display on information resources at the end user computing device 125. The content provided by the content provider computing device 115 can include third party content items or creatives (e.g., ads) for display on information resources such as a website or web page that includes primary content, e.g. content provided by the content publisher computing device 120. The content items can also be displayed on a search results web page. For instance, the content provider computing device 115 can provide or be the source of ads or other content items for display in content slots of content web pages such as a web page of a company where the primary content of the web page is provided by the company, or for display on a search results landing page provided by a search engine. The content items associated with the content provider computing device 115 can be displayed on information resources other than web pages, such as content displayed as part of the execution of an application on a smartphone or other end user computing device 125.

The content publisher computing devices 120 can include servers or other computing devices operated by a content publishing entity to provide primary content for display via the network 105. For instance, the content publisher computing device 120 can include a web page operator who provides primary content for display on the web page. The primary content can include content other than that provided by the content publisher computing device 120, and the web page can include content slots configured for the display of third party content items (e.g., ads) from the content provider computing devices 115. For instance, the content publisher computing device 120 can operate the website of a company and can provide content about that company for display on web pages of the website. The web pages can include content slots configured for the display of third party content items such as ads of the content provider computing device 115. In some implementations, the content publisher computing device 120 includes a search engine computing device (e.g. server) of a search engine operator that operates a search engine website. The primary content of search engine web pages (e.g., a results or landing web page) can include results of a search as well as third party content items displayed in content slots such as content items from the content provider computing device 115. In some implementations, the content publisher computing device 120 can provide primary content to be displayed on a computing device. In some implementations, the content publisher computing device 120 can format the primary content for display on a computing device with a reduced screen size.

The end user computing devices 125 can include computing devices configured to communicate via the network 105 to display data such as the content provided by the content publisher computing device 120 (e.g., primary web page content or other information resources) and the content provided by the content provider computing device 115 (e.g., third party content items such as ads configured for display in a content slot of a web page). The end user computing device 125, the content provider computing device 115, and the content publisher computing device 120 can include desktop computers, laptop computers, tablet computers, smartphones, personal digital assistants, mobile devices, consumer computing devices, servers, clients, digital video recorders, a set-top box for a television, a video game console, wearable devices, or any other computing device configured to communicate via the network 105. The end user computing devices 125 can be communication devices through which an end user can submit requests to receive content. The requests can be requests to a search engine and the requests can include search queries. In some implementations, the requests can be a request to access a web page. In some implementations, the end user computing devices 125 can be a computing device with a reduced display screen size and a touch screen interface.

The content provider computing devices 115, the content publisher computing device 120 and the end user computing devices 125 can include a processor and a memory, i.e., a processing circuit. The memory stores machine instructions that, when executed by processor, cause processor to perform one or more of the operations described herein. The processor may include a microprocessor, application-specific integrated circuit (ASIC), field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which the processor can read instructions. The instructions may include code from any suitable computer-programming language.

The content provider computing devices 115, the content publisher computing devices 120 and the end user computing devices 125 may also include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the content provider computing devices 115, the content publisher computing device 120 and the end user computing devices 125 (e.g., a built-in display, microphone, etc.) or external to the housing of content provider computing devices 115, the content publisher computing device 120 and the end user computing devices 125 (e.g., a monitor connected to the user computing device 115, a speaker connected to the user computing device 115, etc.), according to various implementations. For example, the content provider computing devices 115, the content publisher computing device 120 and the end user computing devices 125 may include an electronic display, which visually displays web pages using webpage data received from one or more content sources and/or from the data processing system 110 via the network 105. In some implementations, a content placement campaign manager or third-party content provider, such as an advertiser, can communicate with the data processing system 110 via the content provider computing devices 115. In some implementations, the advertiser can communicate with the data processing system 110 via a user interface displayed on the user interface devices of the content provider computing devices 115.

The data processing system 110 can include at least one server. For instance, the data processing system 110 can include a plurality of servers located in at least one data center or server farm. In some implementations, the data processing system 110 includes a content placement system, e.g., an ad server or ad placement system. The data processing system 110 can include at least one interactive advertisement generation module 130, at least one advertisement selection module 135 and at least one database 145. The interactive advertisement generation module 130 and the advertisement selection module 135 can each include at least one processing unit, server, virtual server, circuit, engine, agent, appliance, or other logic device such as programmable logic arrays configured to communicate with the database 145 and with other computing devices (e.g., the content provider computing device 115, the content publisher computing device 120, or the end user computing device 125) via the network 105.

The interactive advertisement generation module 130 and the advertisement selection module 135 can include or execute at least one computer program or at least one script. The interactive advertisement generation module 130 and the advertisement selection module 135 can be separate components, a single component, or part of the data processing system 110. The interactive advertisement generation module 130 and the advertisement selection module 135 can include combinations of software and hardware, such as one or more processors configured to execute one or more scripts to receive a request to display, on a display screen of a computing device, content in an ad slot of an information resource and provide, for display, an interactive advertisement in response to the request to display content. The interactive advertisement can include a first content object, a second content object and a script executable by the one or more processors of the computing device. The script can be configured to cause one or more processors of the computing device to display, on the display screen of the computing device, the first content object corresponding to a collapsed version of the interactive advertisement, receive, by the computing device, a first action to activate the interactive advertisement, provide for display, responsive to receiving the first action, a target object identifying a location on the display screen to which to move the first content object, the target object provided for display on a portion of the display screen of the computing device based on a location of the first content object on the display screen, receive, by the computing device, a second action to move the first content object towards the target object, and provide for display, responsive to determining that the second action to move the first content object towards the target object satisfies a triggering event, the second content object corresponding to an expanded version of the interactive ad on the display screen of the computing device, for example.

The data processing system can also include one or more content repositories or databases 145. The databases 145 can be local to the data processing system 110. In some implementations, the databases 145 can be remote to the data processing system 110 but can communicate with the data processing system 110 via the network 105. In some implementations, the databases 145 can store one or more interactive advertisements generated by the interactive advertisement generation module or otherwise received by the interactive advertisement generation module 130. Additional details of the contents of the databases 145 will be provided below.

The interactive advertisement generation module 130 can include any program, module, function, script or hardware and/or software construct that is configured to generate an interactive advertisement. The interactive advertisement generation module can be configured to receive, from a content provider, such as an advertiser, a first content object and a second content object. The first content object can correspond to a collapsed version of the interactive advertisement. The second content object can correspond to an expanded version of the interactive advertisement. In some implementations, the content provider can also provide a third content object corresponding to a target object. The target object may appear in response to an action taken on the first content object of the interactive advertisement. The interactive advertisement generation module 130 can be configured to generate the interactive advertisement using one or more computing languages. In some implementations, the interactive advertisement generation module 130 may utilize one or more libraries of functions. In some implementations, the interactive advertisement generation module 130 can be configured to generate an interactive advertisement configured to be selected for display in an ad slot. In some implementations, the ad slot can be included within an information resource, such as a web page. In some implementations, the ad slot can be included as an interstitial ad of a mobile application executing on a mobile device, such as a tablet or smartphone.

The interactive advertisement generation module 130 can be configured to create a script or programming code, which when executed by a computing device on which the interactive advertisement is served, performs functionality configured to reduce inadvertent clicks or conversions on ads. In some implementations, the interactive advertisement includes code that displays a first content item in an ad slot and in response to detecting that an action is taken on the first content item, displays a target to which the first content item is to be dragged or otherwise moved. The interactive advertisement further includes code that causes a second content item to display upon determining that the first content item is dragged or otherwise moved to the target. The location at which the target appears in response to detecting that an action is taken on the first content item may be based on the location of the first content item relative to the display screen of the computing device on which the interactive advertisement is provided for display. In some implementations, the target may be located at a region of the display screen that is outside of a region of the display screen that is defined by the boundaries of the ad slot in which the first content item is displayed.

In some implementations, the interactive advertisement is configured to include a script that allows a user to drag or otherwise move the first content item displayed within the boundaries of an ad slot of an information resource to a target located outside the boundaries of the ad slot. The script can be designed to allow the functionality of the interactive advertisement control the entire display screen in response to detecting an action taken on the interactive advertisement or the first content item displayed within the boundary defined by the ad slot.

The functionality of the interactive ad can be performed by a mobile or other computing device including one or more processors. The computing device can be an end user computing device on which advertisements can be displayed. The computing device can receive an interactive advertisement comprising a first content object and a second content object. The interactive advertisement can include a script, program, code or computer-executable instructions that is executable by the device on which the interactive advertisement is served or otherwise provided. The computing device can receive the interactive ad from a data processing system, such as the data processing system 110. The computing device can receive the interactive ad responsive to an auction to select an advertisement to provide to the computing device.

In some implementations, the advertisement selection module 135 can select the interactive ad for display on the computing device. In some implementations, the advertisement selection module 135 can be configured to select the interactive ad based on determining a type of device on which the ad is to be served. In some implementations, the advertisement selection module 135 can select the interactive ad in response to determining that the computing device on which to serve the ad includes a touch screen interface.

In some implementations, the advertisement selection module 135 provides the selected interactive ad to the computing device for display in an ad slot of an information resource corresponding to a content publisher. The interactive ad can be generated by a content provider. In some implementations, the data processing system can generate the interactive advertisement using content items received from the content publisher. In some implementations, the computing device can request to receive the interactive ad in response to identifying an ad slot. In some implementations, the computing device can identify an ad slot in an information resource displayed on a browser executing on the computing device or an ad slot in a mobile application executing on the computing device.

The computing device can be configured to display the first content object corresponding to a collapsed version of the interactive advertisement. The computing device can, via a browser or other application executing on the computing device, display the first content object in an ad slot. The first content object can include an image displayed within a boundary defined by the ad slot in which the interactive advertisement is displayed. The first content item can be displayed in an ad slot defined in or provided along with an information resource. In some implementations, the computing device can provide, for display, a call to action indicating a manner in which to expand the collapsed version of the interactive ad to the expanded version of the ad. In some implementations, the call to action can be displayed within the ad slot. In some implementations, the call to action can be displayed adjacent to the ad slot. In some implementations, the call to action can include instructions on how to trigger a conversion of the interactive ad.

The computing device can be configured to receive a first action to activate the interactive advertisement. The first action can include an action performed by a user of the computing device. In some implementations, the first action can be input via a touchscreen interface of the computing device. In some implementations, the first action can be input via a peripheral device, such as a keyboard, mouse, gesture controller, camera, microphone, or motion detector, or other input device. In some implementations, the first action may be a simple tap or touch on any portion of the region of the display screen of the computing device that is defined within the boundary of the ad slot within which the first content item is displayed. In some implementations, the first content item is displayed such that the first content item consumes the entire space defined by the ad slot. The first action may be one of a predetermined set of actions. In some implementations, the first action may be a tap or touch. In some implementations, the first action may be an extended tap or touch. That is, the tap or touch may be longer than a predetermined time period, for example, 20 ms, 50 ms, or 100 ms, among others. In some implementations, the first action can be a double tap, a swipe, or any other action that the interactive ad had identified as a qualifying action. In some implementations, the computing device can receive an action via the touchscreen interface of the computing device and determine if the action is taken on a portion of the display screen that corresponds to the ad slot. The computing device can do so by identifying the identity or location of pixels that define the boundaries of the ad slot. The computing device can then determine if the action was taken on a portion of the display screen that lies within the boundaries of the ad slot by identifying the identity or location of the pixel(s) on which the action was taken and determining the pixels are within the boundaries of the ad slot. The computing device can then determine if the action taken within the boundaries of the ad slot qualify as an action sufficient to activate the interactive advertisement.

The computing device can provide for display, responsive to receiving the first action, a target object identifying a location on the display screen to which to move the first content object. In some implementations, the target object can be provided for display on a portion of the display screen of the computing device based on a location of the first content object on the display screen. The computing device can display a target object that identifies a location to which to move the first content object to cause the mobile application to expand the interactive ad (that is to display the second content item). In some implementations, the target object can identify a path on the display screen along which to move the target object. The computing device can determine a location at which to display the target object. In some implementations, the computing device can determine the location at which to display the target object based on the location of the ad slot relative to the display screen. In some implementations, the computing device can determine the location at which to display the target object in a region of the display screen that is outside of the region defined by the ad slot. In some implementations, the computing device can determine to display the target object towards a top portion of the display screen responsive to determining that the pixels of the ad slot are towards a bottom portion of the display screen. Conversely, the computing device can determine to display the target object towards a bottom portion of the display screen responsive to determining that the pixels of the ad slot are towards a top portion of the display screen. In some implementations, the computing device can determine to display the target object towards a center of the display.

In some implementations, the computing device can display the target object in a first appearance when a distance from the first edge of the first content object to a corresponding edge of the target object is greater than a predetermined distance and display the target object in a second appearance when the distance from the first edge of the first content object to the corresponding edge of the target object is less than a predetermined distance from the corresponding edge of the target object. In some implementations, the computing device can signal whether the first content object has moved past a threshold distance that will result in the second content object being displayed upon releasing the first content item by showing a loading bar that gradually fills an area of a circle, rectangle or other object instead of causing the target object's color to change. In some implementations, the computing device may identify the speed at which the first content object is dragged or otherwise moved to determine whether or not to display the second content object. In some implementations, the computing device can display the second content object upon determining that the speed at which the first content object is dragged exceeds a predetermined threshold speed.

In some implementations, the computing device can determine a location at which to display the target object by determining at least one coordinate pair of pixels corresponding to a first edge of the first content object and an identity of the first edge of the first content object and determining, based on the at least one coordinate pair of pixels and the first edge of the first content object, a second coordinate pair at which to position a second edge of the target object. In other words, the computing device can identify one or more pixel coordinates corresponding to an edge of the first content object and determine if the edge is a bottom edge, top edge, left edge or right edge (or corner). The computing device can determine, based on the identified pixel coordinates of an edge of the first content object, one or more pixel coordinates at which to display a corresponding edge of the target object. In some implementations, the computing device can determine a location at which to display the target object by determining at least one coordinate pair of pixels corresponding to a center of the first content object and determining, based on the at least one coordinate pair of pixels of the center of the first content object, a second coordinate pair at which to position a center of the target object. In some implementations, the computing device can determine a location at which to display the target object by determining at least one coordinate pair of pixels corresponding to a center of the first content object and determining, based on the at least one coordinate pair of pixels and the center of the first content object, a second coordinate pair at which to position a center of the target object.

In some implementations, the computing device can determine a size of the target object based on the position and/or size of the ad slot in which the first content object is displayed. In some implementations, the computing device can determine a location to display the target object based on at least one of a size of the first content object, a current location of the first content object on the display, a size of the target object and a size of the display. The computing device can determine a size of the target object such that the target object is a predetermined distance from the ad slot. In some implementations, the greater the distance between the target object and the ad slot is reduces the risk of an inadvertent conversion of the content object. The computing device can also determine a shape of the target object. In some implementations, the ad slot can be rectangular in shape but the target object can be a circle.

In some implementations, the target object can be a content item included in the interactive ad. The target object can be a graphic or include text or images provided by the advertiser. In some implementations, the target object can include brand messaging or may include content inviting the user to move the first content object to the target location. In some implementations, the target object can be a rectangular object that is shown in a first appearance, which changes to a second appearance, in response to determining that upon releasing the first content item will result in the second content item being displayed by the computing device. In some implementations, the first appearance can correspond to a first color, shape, opacity, size, among others, and the second appearance can correspond to a second color, shape, opacity, size, among others. In some implementations, the object can be a loading bar that appears empty in a first appearance and appears full in a second appearance. In some implementations, the target object can be an icon that is either static, dynamic or animated. The icon may change states based on the position of the first content item relative to the target location.

The computing device can receive a second action to move the first content object towards the target object. In some implementations, upon receiving the first action, the computing device can activate a function that allows the interactive ad to control the entire display screen. This is possible because the script or code of the interactive ad can include functionality that calls upon a library of functions that allow the interactive ad to identify any user actions performed anywhere on the display screen and not just in the region defined by the ad slot. Responsive to the computing device activating the function that allows the interactive ad to control the entire display screen, the computing device can detect any actions performed. The second action can correspond to a user dragging the first content object to the target location. In some implementations, the second action can correspond to receiving a swipe gesture that mimics dragging the first content object to the target location. In some implementations, the second action can include an action holding the first content object and dragging it to the target location. In some implementations, the second action may be a single action (i.e., the user cannot remove their finger from the screen in between the action). In some implementations, to reduce the size of the interactive ad when delivering the ad to the computing device, the interactive ad may not include the second content object. In some implementations, the computing device can be configured to request to receive the second content object responsive to the user taking an action on the first content object. In some implementations, the second content object can be downloaded responsive to the first content object being dragged towards the target location. In some implementations, in response to the user moving the first content item towards the target location, the computing device can be configured to generate feedback indicative of the user interacting with the first content object. Examples of the feedback can include a short vibrating motor pulse, a sound, a visual, or some other form of sensory feedback.

The computing device can determine a pixel location at which the second action begins and determine if the pixel location corresponds to a pixel location of the first content object. The computing device can then determine if the path of the second action (or gesture) corresponds to dragging or otherwise moving the first content item to the target location by determining a pixel location at which the second action ends (when the user lifts their finger). If the pixel location at which the second action ends corresponds to a region within the target location, the computing device determines that the second action qualifies as a triggering action that triggers a conversion event, causing the computing device to display the second content object. In some implementations, if the first content item is moved beyond a predefined threshold area even if the second action is not completed (by lifting the finger), the computing device can display the second content object.

In some implementations, the target object can include a visual indicator that can be displayed in one or more colors. The target object can be displayed in a first color in response to the computing device detecting the beginning of the second action. In some implementations, the beginning of the second action can be detected if the user begins the second action by contacting a portion of the touch screen that corresponds to a pixel location defined within the first content item or ad slot. The target object can be displayed in response to detecting the beginning of the second action and remains displayed until the second action is completed. As the user moves their finger from the first content item towards the target location, the computing device is determining whether the finger is now within a trigger region of the display screen sufficient to trigger the conversion event. In some implementations, the trigger region of the display screen within which if the finger is released and the second action completed will result in the conversion event can be defined by the computing device. In some implementations, the computing device can define the trigger region based on the location and size of the ad slot relative to the boundaries of the display screen.

In some implementations, the computing device can identify pixel locations of the boundary of the ad slot and identify pixel locations of the boundaries of the display screen. The computing device can then determine if the ad slot is within a top half of the display screen or the bottom half of the display screen. The computing device can do so by identifying a pixel location of a midpoint of the display screen and a midpoint of the ad slot. If the midpoint of the display screen is above the midpoint of the ad slot, the ad slot is considered to be within the bottom portion of the display screen. Conversely, if the midpoint of the display screen is below the midpoint of the ad slot, the ad slot is considered to be within the top portion of the display screen. The computing device can determine a location for the target object based on whether the ad slot is in the top portion of the display screen or the bottom portion of the display screen. In some implementations, the computing device can set the location of the target object in the portion of the display screen in which the center of the ad slot is not located. Further, the computing device can set a location of the target object by identifying a pixel corresponding to a center of the target object. The computing device can then determine a distance between the center of the ad slot and the center of the target object. Based on this distance, the computing device can determine a pixel location within the display screen that serves as the threshold. In some implementations, the threshold is located at the midpoint of the distance between the center of the ad slot and the center of the target object. In this way, when the computing device is receiving the second action and the first content object is dragged from the ad slot towards the target location, the computing device determines the pixel location of the center of the first content object relative to the pixel location of the threshold. In some implementations, the target location may be within the same portion as the first content object but at a distance sufficiently large enough to require a user to actively move the first content object to the target location (i.e., sufficiently large to avoid expansion of the ad due to inadvertent movements of the first content object).

If the computing device determines that the pixel location of the center of the first content object is in between the center of the ad slot and the pixel location of the threshold, the computing device displays the target object in a first color indicating that upon releasing the finger (or terminating the second action at this point), the first content object will return to the ad slot and no conversion event will take place. Conversely, if the computing device determines that the pixel location of the center of the first content object is in between the center of the target location and the pixel location of the threshold, the computing device displays the target object in a second color indicating that upon releasing the finger (or terminating the second action at this point), a conversion event will take place and the second content item will be displayed. In some implementations, the computing device can receive, via the display screen of the computing device, an input indicative of initiating the second action to move the first content object from an original location towards the target object. The computing device can then provide, for display, a visual indicator indicating that the expanded version of the interactive ad will be displayed on the display screen of the computing device upon terminating the second action.

In some implementations, the second action commences when the user touches the touch screen and terminates when the user stops touching the touch screen of the computing device. As such, depending on where the finger of the user is at the time the user releases their finger, the computing device can determine if the second action corresponds to a triggering action that results in a conversion event. As described above, although the triggering action is based on the location of the center of the first content object (in the event the first content object is being dragged to the target location), the computing device can determine if a triggering action occurs based on a location of the finger of the user at the time the finger is released from the touch screen. In this way, the triggering action can be based on other actions that do not involve dragging the first content object to the target location.

The computing device can then provide for display, responsive to determining that the second action to move the first content object towards the target object satisfies a triggering event, the second content object corresponding to an expanded version of the interactive ad on the display screen of the computing device. In some implementations, the computing device can display the second content object as a floating ad on top of the information resource. In some implementations, the floating ad can include an object to close the floating ad. In some implementations, the floating ad can define boundaries and responsive to receiving an action within the boundaries of the floating ad, the computing device can direct the user to a landing page to which the floating ad is linked. In directing the user to a landing page, the computing device can load an information resource corresponding to the landing page or deploy one or more applications. In some implementations, the mobile application can execute one or more actions on the computing device in response to receiving a qualifying action on the second content objects. In some implementations, the second content objects can include one or more icons configured to cause the computing device to perform different tasks. For instance, the second content object can include a camera icon configured to launch a camera application on the computing device, a messaging icon configured to launch a messaging application on the computing device, and a phone icon configured to launch a phone application on the computing device.

In some implementations, responsive to receiving the second action to move the first content object towards the target object, the computing device can increase the opacity of the overlay provided over the information resource displayed on the computing device as the first content object moves closer towards the target object.

Figure 2A:
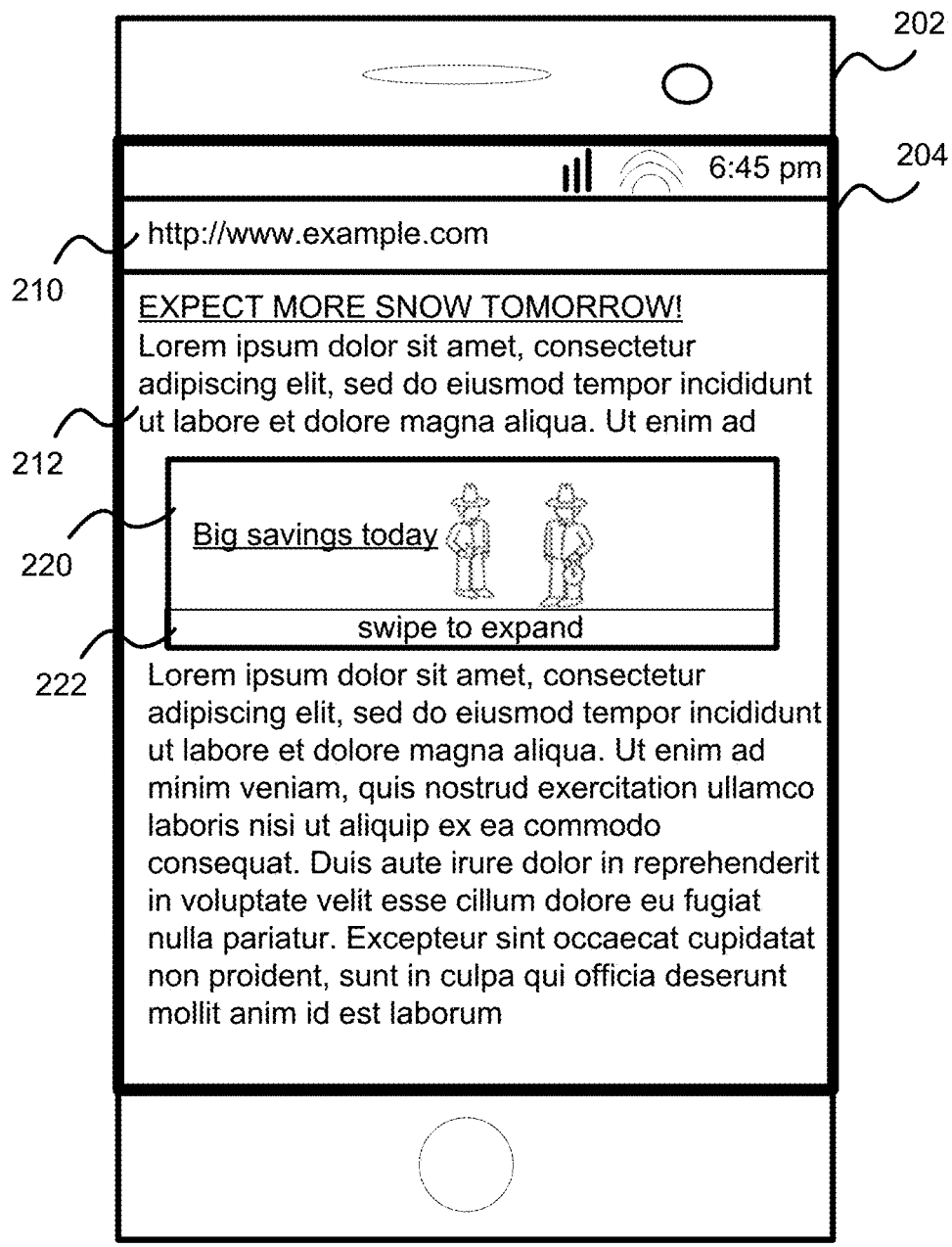
FIG. 2A is a front view of a computing device displaying a collapsed version of an interactive advertisement configured to reduce inadvertent or low quality clicks or taps towards a top of the display portion of the computing device, according to an illustrative implementation.
Figure 2B:
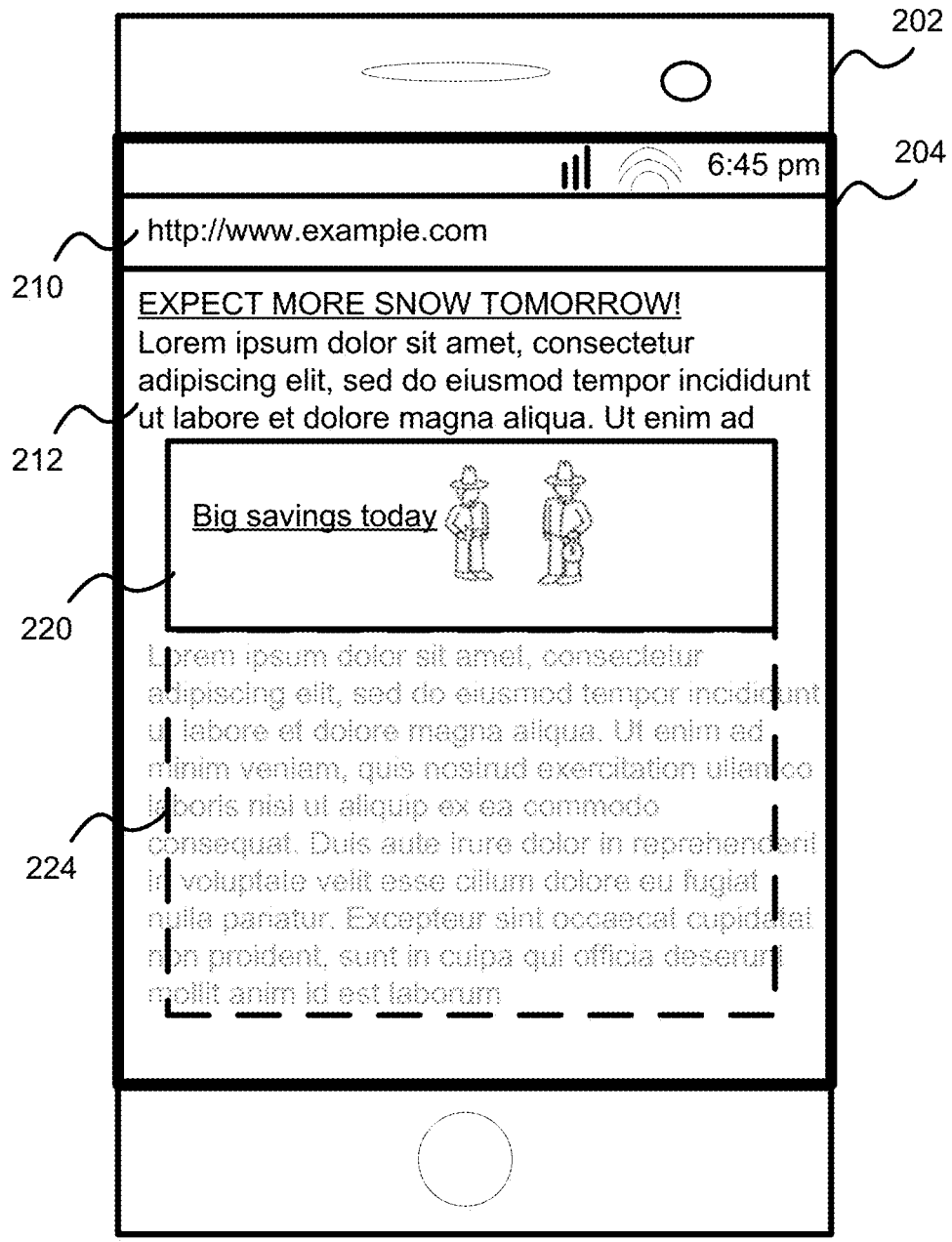
FIG. 2B is a front view of the computing device displaying the collapsed version of the interactive advertisement and a target content object, according to an illustrative implementation.
Figure 2C:
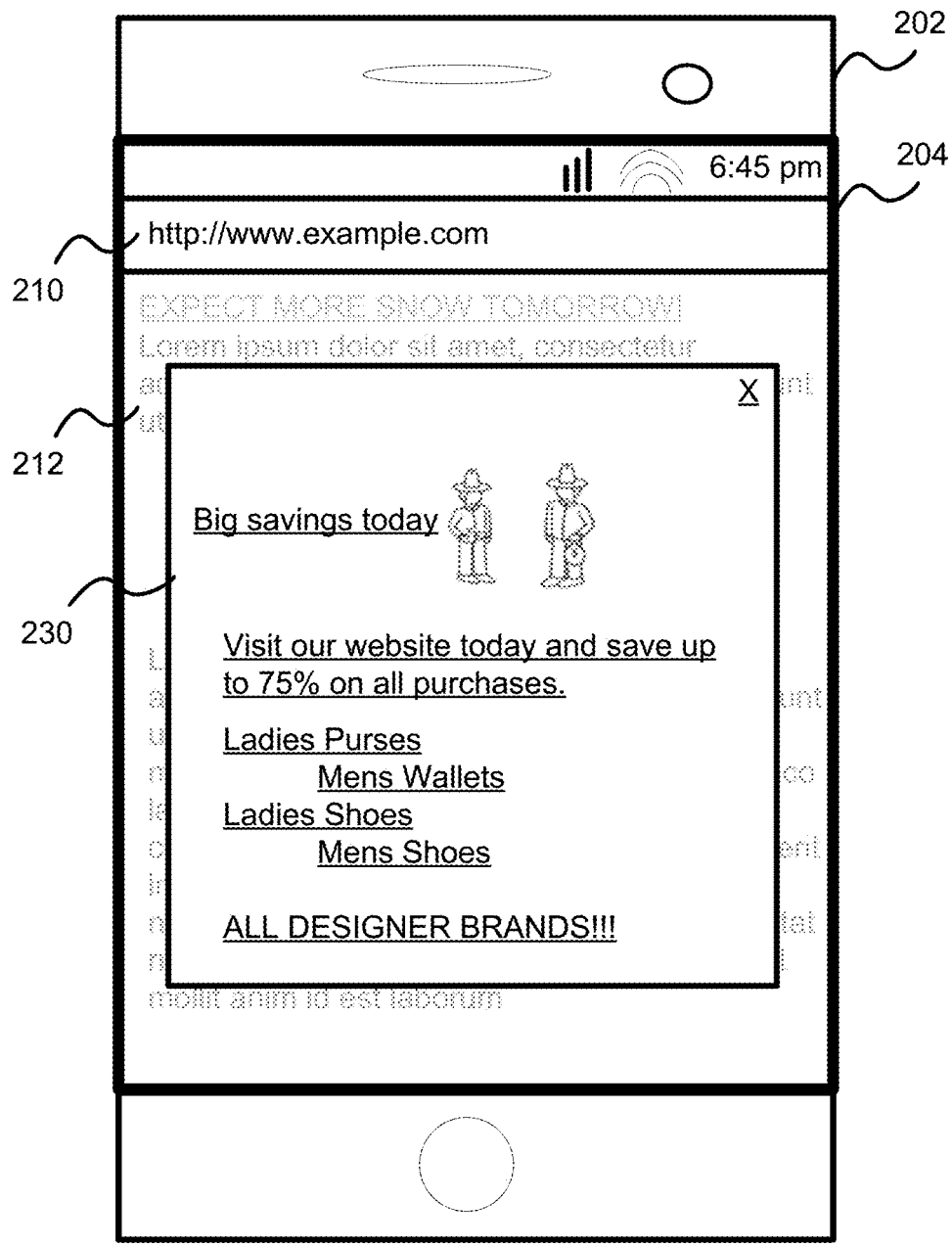
FIG. 2C is a front view of the computing device displaying an expanded version of the interactive advertisement, according to an illustrative implementation.

FIG. 2A is a front view of a computing device displaying a collapsed version of an interactive advertisement configured to reduce inadvertent or low quality clicks or taps towards a top of the display portion of the computing device, according to an illustrative implementation. The computing device 202 includes a display screen 204. The display screen can be a touch screen configured to receive input from a user via touch. A browser is executing on the computing device 202 and the browser is displaying an information resource 210. The information resource 210 includes primary content 212 provided by the content publisher of the information resource 210 and an ad slot in which an interactive advertisement, such as the interactive ad 220 is displayed. A call to action object 222 is also displayed indicating how to interact with the interactive ad. As shown in FIG. 2A, the first content item 224 of the interactive ad 220 is displayed. In response to a user taking an action on the first content item 224 of the interactive ad 220, a target content object is provided for display as shown in FIG. 2B. FIG. 2B is a front view of the computing device displaying the collapsed version of the interactive advertisement and a target content object, according to an illustrative implementation. The target content object 226 can be any object that defines a location to which to drag or otherwise move the first content item. As shown in FIG. 2B, the target content object can be a rectangle extending from the first content item. The location of the target content object can be based on the location of the first content object (or the ad slot within which the first content object is displayed). The target content object extends towards the bottom of the display screen 204 as the ad slot containing the first content item 224 is towards the top of the display screen 204. The target content object can be displayed in a first appearance (color, shape, size, etc.) when the first content object is at a position that will not trigger the appearance of the second content object (or expanded version of the interactive advertisement). When the first content object is at a position that will trigger the appearance of the second content object, the appearance of the target content object may change. For example, the size, shape, or color of the target content object may change. The position that will trigger the appearance of the second content object may be identified by the region 228. If the first content item 220 is released within the region 228, the computing device can be configured to expand the interactive advertisement 220 and display the second content item 230. In some implementations, the second content item can be displayed as a floating ad, as shown in FIG. 2C. FIG. 2C is a front view of the computing device displaying the second content item 230, which corresponds to an expanded version of the interactive advertisement 220 shown in FIGS. 2A and 2B. The second content item 230 can include additional details and may be linked to a landing page. If a user clicks on the second content item, the computing device will direct the user to the landing page. In some implementations, the browser executing on the computing device will launch the landing page on the existing tab of the browser in which the information resource 210 was displayed. In some implementations, the browser executing on the computing device will launch the landing page on a new tab of the browser.

Figure 3A:
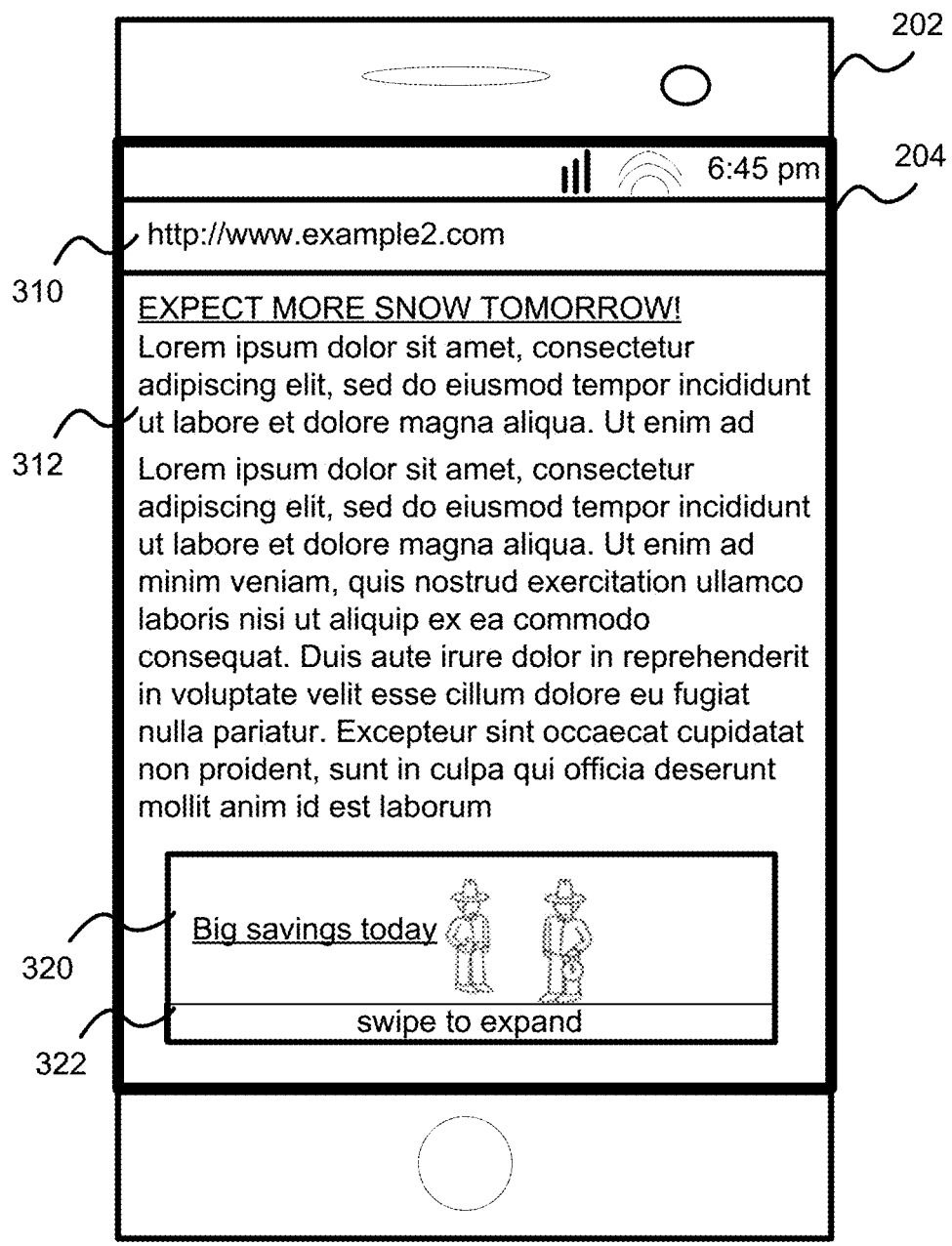
FIG. 3A is a front view of a computing device displaying a collapsed version of an interactive advertisement configured to reduce inadvertent or low quality clicks or taps towards a bottom of the display portion of the computing device, according to an illustrative implementation.
Figure 3B:
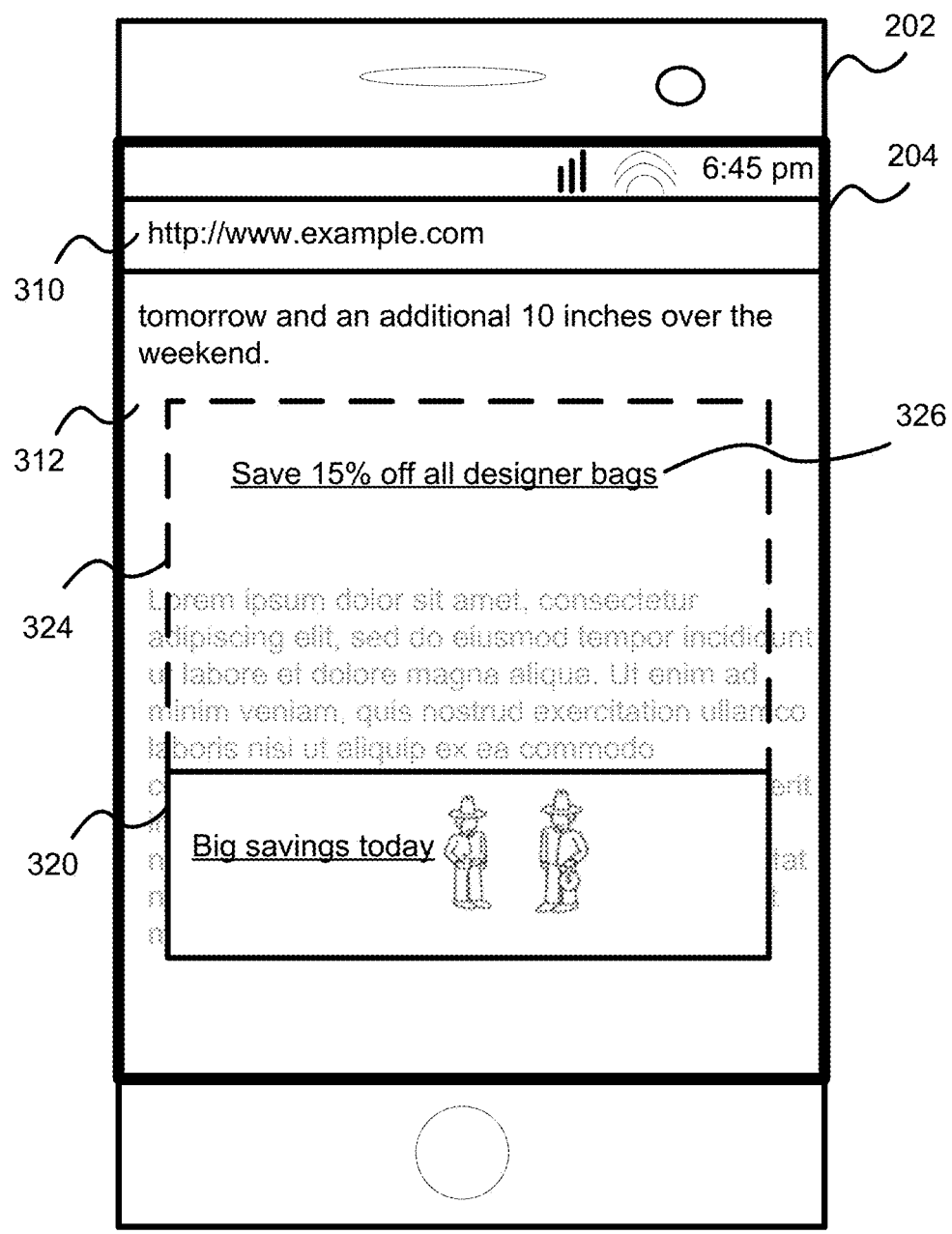
FIG. 3B is a front view of the computing device displaying the collapsed version of the interactive advertisement and a target content object displayed above the interactive advertisement, according to an illustrative implementation.
Figure 3C:
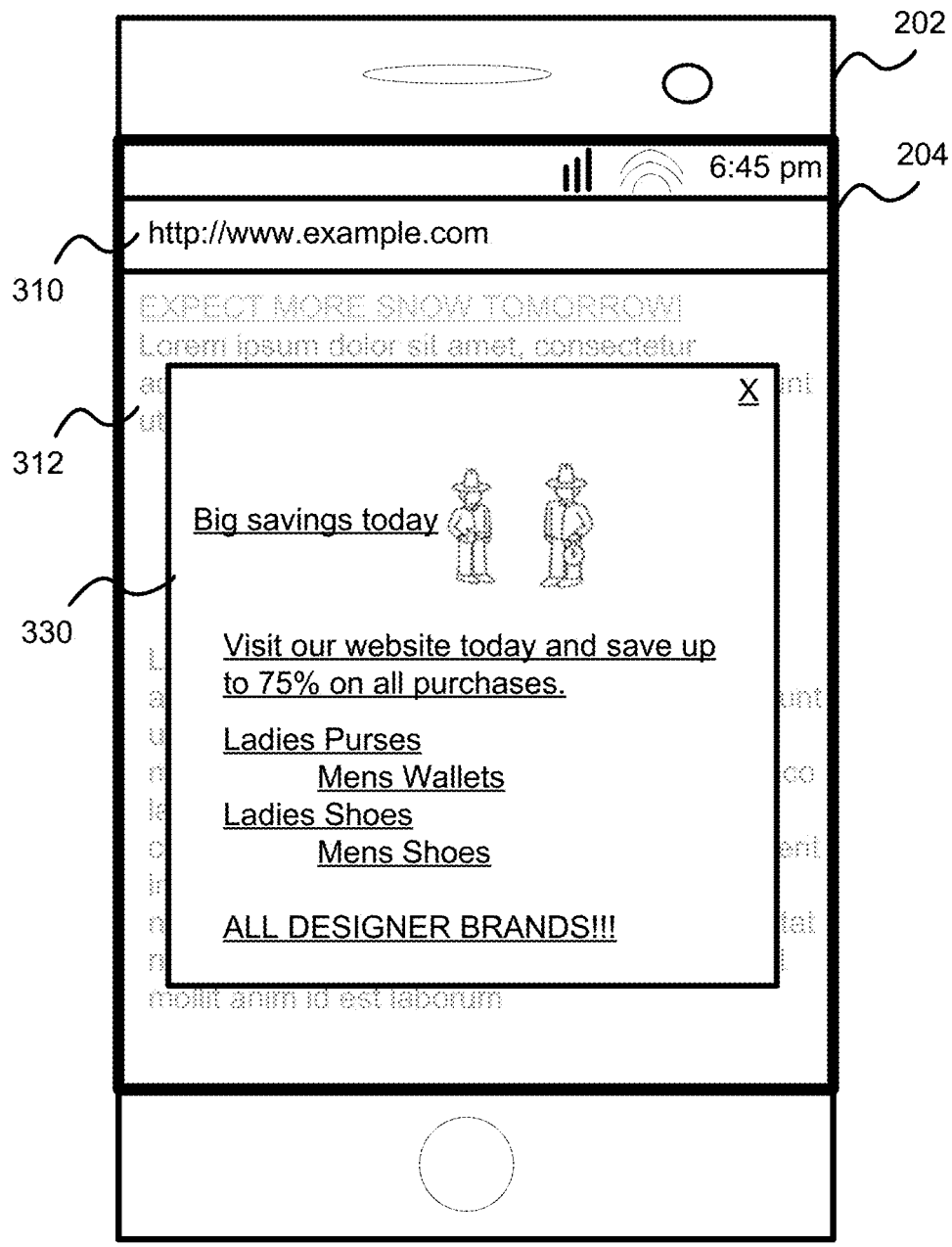
FIG. 3C is a front view of the computing device displaying an expanded version of the interactive advertisement, according to an illustrative implementation.

FIG. 3A is a front view of a computing device displaying a collapsed version of an interactive advertisement configured to reduce inadvertent or low quality clicks or taps towards a bottom of the display portion of the computing device, according to an illustrative implementation. The computing device 202 includes the display 204 and executes a browser that displays content corresponding to an information resource 310. The information resource 310 includes primary content 312 and an ad slot including the interactive advertisement 320. The interactive advertisement 320 is similar to the interactive advertisement 220 but differs in that the target content object 326 that appears in response to an action taken on the first content item 324 of the interactive advertisement 320 is located above the first content item 324 due to the first content item 324 appearing towards the bottom of the display screen 204. FIG. 3B is a front view of the computing device displaying the collapsed version of the interactive advertisement and a target content object 326 displayed above the interactive advertisement. The target content object further includes additional content 328 that can be relevant to the user to determine if the user is actually interested in the content of the interactive advertisement. The additional content can be provided by the advertiser and may be useful to help the user determine if they want to view the ad. In the example shown in FIG. 3B, a user not particularly interested in designer bags may end up not engaging with the advertisement upon viewing the additional content 328. In an advertising model in which the advertiser pays per conversion, the advertiser may have saved money by not having to pay for the conversion of this user. FIG. 3C is a front view of the computing device displaying an expanded version of the interactive advertisement, according to an illustrative implementation. The second content item 330, similar to the second content item 230 shown in FIG. 2C, can include additional details relating to the interactive advertisement 320 and may be linked to a landing page. If a user clicks on the second content item 330, the computing device will direct the user to the landing page. In some implementations, the browser executing on the computing device will launch the landing page on the existing tab of the browser in which the information resource 310 was displayed. In some implementations, the browser executing on the computing device will launch the landing page on a new tab of the browser.

Figure 4:
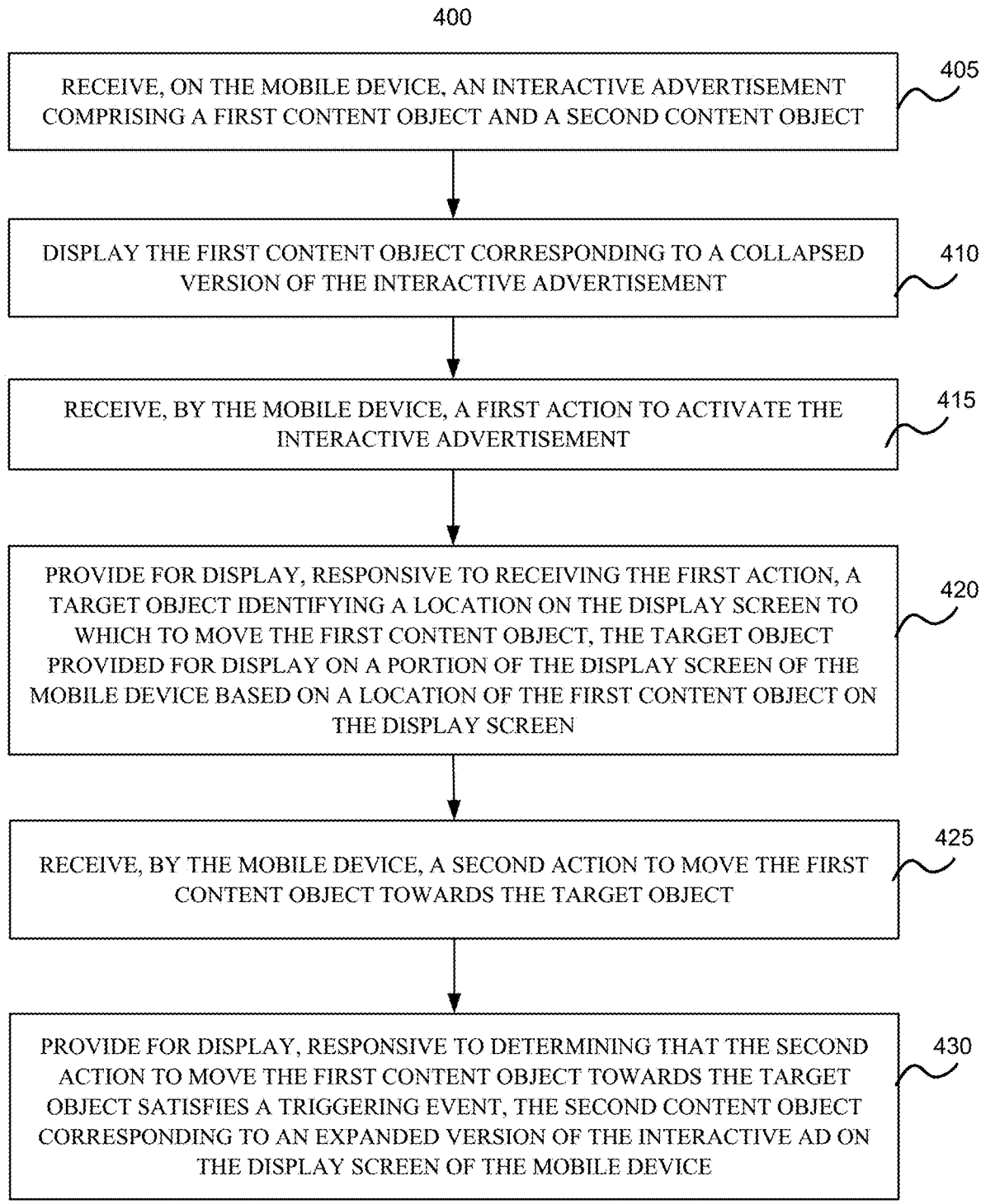
FIG. 4 is a flow diagram depicting a method of reducing low quality conversions of advertisements displayed on a computing device, according to an illustrative implementation.

FIG. 4 is a flow diagram depicting a method of reducing low quality conversions of advertisements displayed on a computing device, according to an illustrative implementation. The functionality described in the method can be performed by a computing device including one or more processors. The computing device can be an end user computing device on which advertisements can be displayed. The computing device can receive an interactive advertisement comprising a first content object and a second content object (BLOCK 405). The computing device can display the first content object corresponding to a collapsed version of the interactive advertisement (BLOCK 410). The computing device can receive a first action to activate the interactive advertisement (BLOCK 415). The computing device can provide for display, responsive to receiving the first action, a target object identifying a location on the display screen to which to move the first content object (BLOCK 420). The computing device can receive a second action to move the first content object towards the target object (BLOCK 425). The computing device can then provide for display, responsive to determining that the second action to move the first content object towards the target object satisfies a triggering event, the second content object corresponding to an expanded version of the interactive ad on the display screen of the computing device (BLOCK 430).

In further detail, the computing device can receive an interactive advertisement comprising a first content object and a second content object (BLOCK 405). The interactive advertisement can include a script, program, code or computer-executable instructions that is executable by the device on which the interactive advertisement is served or otherwise provided. The computing device can receive the interactive ad from a data processing system, such as the data processing system 110 shown in FIG. 1. The computing device can receive the interactive ad responsive to an auction to select an advertisement to provide to the computing device. In some implementations, the interactive ad is provided to the computing device for display in an ad slot of an information resource corresponding to a content publisher. The interactive ad can be generated by a content provider. In some implementations, the data processing system can generate the interactive advertisement using content items received from the content publisher. In some implementations, the computing device can request to receive the interactive ad in response to identifying an ad slot. In some implementations, the computing device can identify an ad slot in an information resource displayed on a browser executing on the computing device or an ad slot in a mobile application executing on the computing device.

The computing device can display the first content object corresponding to a collapsed version of the interactive advertisement (BLOCK 410). The computing device can, via a browser or other application executing on the computing device, display the first content object in an ad slot. The first content object can include an image displayed within a boundary defined by the ad slot in which the interactive advertisement is displayed. The first content item can be displayed in an ad slot defined in or provided along with an information resource. In some implementations, the computing device can provide, for display, a call to action indicating a manner in which to expand the collapsed version of the interactive ad to the expanded version of the ad. In some implementations, the call to action can be displayed within the ad slot. In some implementations, the call to action can be displayed adjacent to the ad slot. In some implementations, the call to action can include instructions on how to trigger a conversion of the interactive ad.

The computing device can receive a first action to activate the interactive advertisement (BLOCK 415). The first action can include an action performed by a user of the computing device. In some implementations, the first action can be input via a touchscreen interface of the computing device. In some implementations, the first action can be input via a peripheral device, such as a keyboard, mouse, or other input device. In some implementations, the first action may be a simple tap or touch on any portion of the region of the display screen of the computing device that is defined within the boundary of the ad slot within which the first content item is displayed. In some implementations, the first content item is displayed such that the first content item consumes the entire space defined by the ad slot. The first action may be one of a predetermined set of actions. In some implementations, the first action may be a tap or touch. In some implementations, the first action may be an extended tap or touch. That is, the tap or touch may be longer than a predetermined time period, for example, 2 ms. In some implementations, the first action can be a double tap, a swipe, or any other action that the interactive ad had identified as a qualifying action. In some implementations, the computing device can receive an action via the touchscreen interface of the computing device and determine if the action is taken on a portion of the display screen that corresponds to the ad slot. The computing device can do so by identifying the identity or location of pixels that define the boundaries of the ad slot. The computing device can then determine if the action was taken on a portion of the display screen that lies within the boundaries of the ad slot by identifying the identity or location of the pixel(s) on which the action was taken and determining the pixels are within the boundaries of the ad slot. The computing device can then determine if the action taken within the boundaries of the ad slot qualify as an action sufficient to activate the interactive advertisement.

The computing device can provide for display, responsive to receiving the first action, a target object identifying a location on the display screen to which to move the first content object (BLOCK 420). In some implementations, the target object can be provided for display on a portion of the display screen of the computing device based on a location of the first content object on the display screen. The computing device can display a target object that identifies a location to which to move the first content object to cause the mobile application to expand the interactive ad (that is to display the second content item). The computing device can determine a location at which to display the target object. In some implementations, the computing device can determine the location at which to display the target object based on the location of the ad slot relative to the display screen. In some implementations, the computing device can determine the location at which to display the target object in a region of the display screen that is outside of the region defined by the ad slot. In some implementations, the computing device can determine to display the target object towards a top portion of the display screen responsive to determining that the pixels of the ad slot are towards a bottom portion of the display screen. Conversely, the computing device can determine to display the target object towards a bottom portion of the display screen responsive to determining that the pixels of the ad slot are towards a top portion of the display screen.

In some implementations, the computing device can display the target object in a first color when a distance from the first edge of the first content object to a corresponding edge of the target object is greater than a predetermined distance and display the target object in a second color when the distance from the first edge of the first content object to the corresponding edge of the target object is less than a predetermined distance from the corresponding edge of the target object.

In some implementations, the computing device can determine a location at which to display the target object by determining at least one coordinate pair of pixels corresponding to a first edge of the first content object and an identity of the first edge of the first content object and determining, based on the at least one coordinate pair of pixels and the first edge of the first content object, a second coordinate pair at which to position a second edge of the target object. In other words, the computing device can identify one or more pixel coordinates corresponding to an edge of the first content object and determine if the edge is a bottom edge, top edge, left edge or right edge (or corner). The computing device can determine, based on the identified pixel coordinates of an edge of the first content object, one or more pixel coordinates at which to display a corresponding edge of the target object. In some implementations, the computing device can determine a location at which to display the target object by determining at least one coordinate pair of pixels corresponding to a center of the first content object and determining, based on the at least one coordinate pair of pixels of the center of the first content object, a second coordinate pair at which to position a center of the target object.

In some implementations, the computing device can determine a size of the target object based on the position and/or size of the ad slot in which the first content object is displayed. In some implementations, the computing device can determine a location to display the target object based on at least one of a size of the first content object, a current location of the first content object on the display, a size of the target object and a size of the display. The computing device can determine a size of the target object such that the target object is a predetermined distance from the ad slot. In some implementations, the greater the distance between the target object and the ad slot is reduces the risk of an inadvertent conversion of the content object. The computing device can also determine a shape of the target object. In some implementations, the ad slot can be rectangular in shape but the target object can be a circle.

In some implementations, the target object can be a content item included in the interactive ad. The target object can be a graphic or include text or images provided by the advertiser. In some implementations, the target object can include brand messaging or may include content inviting the user to move the first content object to the target location. In some implementations, the target object can be a rectangular object that is shown in a first color, which changes to a second color, in response to determining that upon releasing the first content item will result in the second content item being displayed by the computing device.

The computing device can receive a second action to move the first content object towards the target object (BLOCK 425). In some implementations, upon receiving the first action, the computing device can activate a function that allows the interactive ad to control the entire display screen. This is possible because the script or code of the interactive ad can include functionality that calls upon a library of functions that allow the interactive ad to identify any user actions performed anywhere on the display screen and not just in the region defined by the ad slot. Responsive to the computing device activating the function that allows the interactive ad to control the entire display screen, the computing device can detect any actions performed. The second action can correspond to a user dragging the first content object to the target location. In some implementations, the second action can correspond to receiving a swipe gesture that mimics dragging the first content object to the target location. In some implementations, the second action can include an action holding the first content object and dragging it to the target location. In some implementations, the second action may be a single action (i.e., the user cannot remove their finger from the screen in between the action).

The computing device can determine a pixel location at which the second action begins and determine if the pixel location corresponds to a pixel location of the first content object. The computing device can then determine if the path of the second action (or gesture) corresponds to dragging or otherwise moving the first content item to the target location by determining a pixel location at which the second action ends (when the user lifts their finger). If the pixel location at which the second action ends corresponds to a region within the target location, the computing device determines that the second action qualifies as a triggering action that triggers a conversion event, causing the computing device to display the second content object.

In some implementations, the target object can include a visual indicator that can be displayed in one or more colors. The target object can be displayed in a first color in response to the computing device detecting the beginning of the second action. In some implementations, the beginning of the second action can be detected if the user begins the second action by contacting a portion of the touch screen that corresponds to a pixel location defined within the first content item or ad slot. The target object can be displayed in response to detecting the beginning of the second action and remains displayed until the second action is completed. As the user moves their finger from the first content item towards the target location, the computing device is determining whether the finger is now within a trigger region of the display screen sufficient to trigger the conversion event. In some implementations, the trigger region of the display screen within which if the finger is released and the second action completed will result in the conversion event can be defined by the computing device. In some implementations, the computing device can define the trigger region based on the location and size of the ad slot relative to the boundaries of the display screen.

In some implementations, the computing device can identify pixel locations of the boundary of the ad slot and identify pixel locations of the boundaries of the display screen. The computing device can then determine if the ad slot is within a top half of the display screen or the bottom half of the display screen. The computing device can do so by identifying a pixel location of a midpoint of the display screen and a midpoint of the ad slot. If the midpoint of the display screen is above the midpoint of the ad slot, the ad slot is considered to be within the bottom portion of the display screen. Conversely, if the midpoint of the display screen is below the midpoint of the ad slot, the ad slot is considered to be within the top portion of the display screen. The computing device can determine a location for the target object based on whether the ad slot is in the top portion of the display screen or the bottom portion of the display screen. In some implementations, the computing device can set the location of the target object in the portion of the display screen in which the center of the ad slot is not located. Further, the computing device can set a location of the target object by identifying a pixel corresponding to a center of the target object. The computing device can then determine a distance between the center of the ad slot and the center of the target object. Based on this distance, the computing device can determine a pixel location within the display screen that serves as the threshold. In some implementations, the threshold is located at the midpoint of the distance between the center of the ad slot and the center of the target object. In this way, when the computing device is receiving the second action and the first content object is dragged from the ad slot towards the target location, the computing device determines the pixel location of the center of the first content object relative to the pixel location of the threshold.

If the computing device determines that the pixel location of the center of the first content object is in between the center of the ad slot and the pixel location of the threshold, the computing device displays the target object in a first color indicating that upon releasing the finger (or terminating the second action at this point), the first content object will return to the ad slot and no conversion event will take place. Conversely, if the computing device determines that the pixel location of the center of the first content object is in between the center of the target location and the pixel location of the threshold, the computing device displays the target object in a second color indicating that upon releasing the finger (or terminating the second action at this point), a conversion event will take place and the second content item will be displayed. In some implementations, the computing device can receive, via the display screen of the computing device, an input indicative of initiating the second action to move the first content object from an original location towards the target object. The computing device can then provide, for display, a visual indicator indicating that the expanded version of the interactive ad will be displayed on the display screen of the computing device upon terminating the second action.

In some implementations, the second action commences when the user touches the touch screen and terminates when the user stops touching the touch screen of the computing device. As such, depending on where the finger of the user is at the time the user releases their finger, the computing device can determine if the second action corresponds to a triggering action that results in a conversion event. As described above, although the triggering action is based on the location of the center of the first content object (in the event the first content object is being dragged to the target location), the computing device can determine if a triggering action occurs based on a location of the finger of the user at the time the finger is released from the touch screen. In this way, the triggering action can be based on other actions that do not involve dragging the first content object to the target location.

The computing device can then provide for display, responsive to determining that the second action to move the first content object towards the target object satisfies a triggering event, the second content object corresponding to an expanded version of the interactive ad on the display screen of the computing device (BLOCK 430). In some implementations, the computing device can display the second content object as a floating ad on top of the information resource. In some implementations, the floating ad can include an object to close the floating ad. In some implementations, the floating ad can define boundaries and responsive to receiving an action within the boundaries of the floating ad, the computing device can direct the user to a landing page to which the floating ad is linked. In directing the user to a landing page, the computing device can load an information resource corresponding to the landing page or deploy one or more applications. In some implementations, the mobile application can execute one or more actions on the computing device in response to receiving a qualifying action on the second content objects. In some implementations, the second content objects can include one or more icons configured to cause the computing device to perform different tasks. For instance, the second content object can include a camera icon configured to launch a camera application on the computing device, a messaging icon configured to launch a messaging application on the computing device, and a phone icon configured to launch a phone application on the computing device.

In some implementations, responsive to receiving the second action to move the first content object towards the target object, the computing device can increase the opacity of the overlay provided over the information resource displayed on the computing device as the first content object moves closer towards the target object.

Figure 5A:
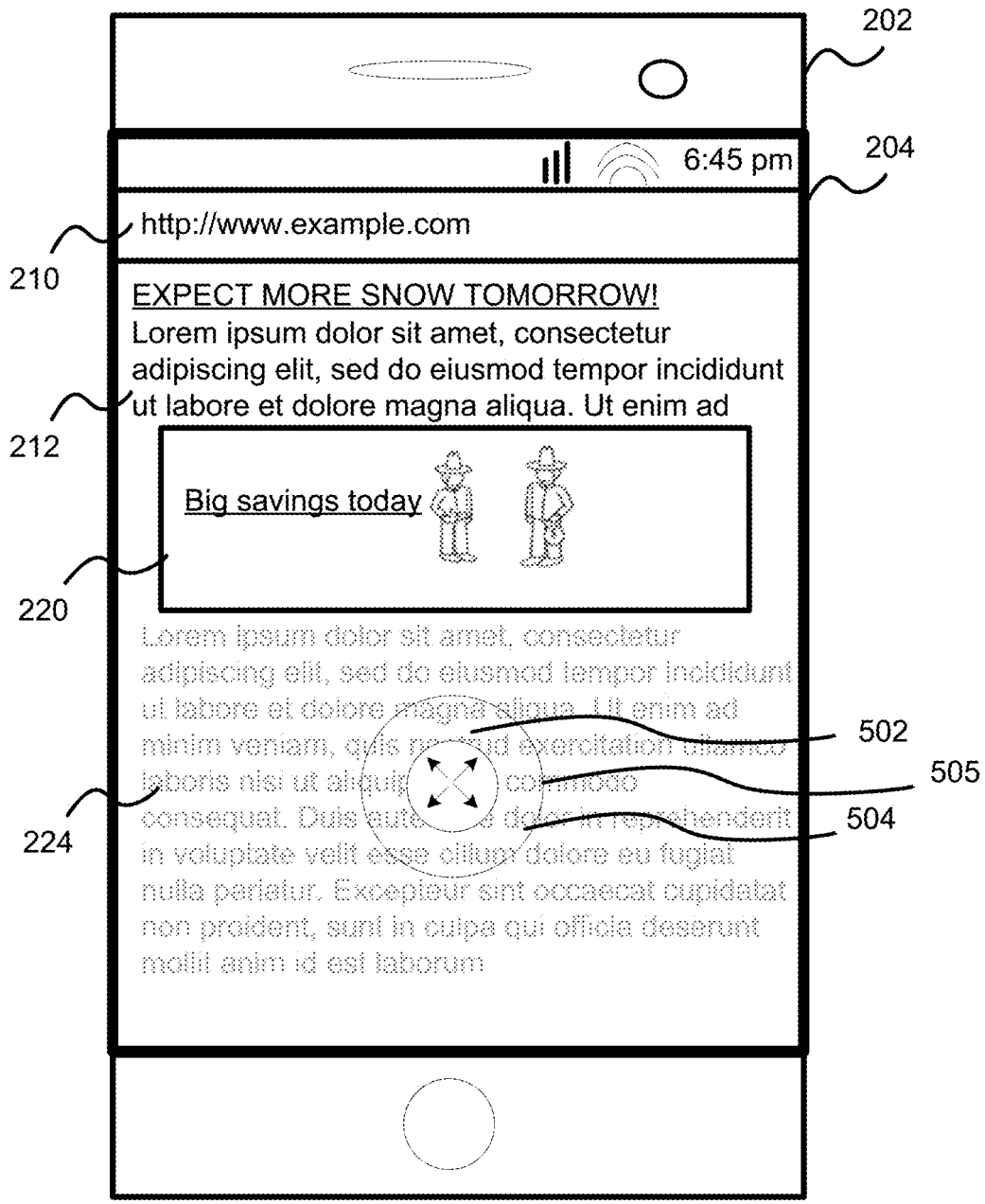
FIG. 5A is a front view of a computing device displaying a collapsed version of an interactive advertisement configured to reduce inadvertent or low quality clicks or taps and a visual indicator in a first state, according to an illustrative implementation.

Referring now to FIG. 5A, FIG. 5A is a front view of a computing device displaying a collapsed version of an interactive advertisement configured to reduce inadvertent or low quality clicks or taps and a visual indicator in a first state, according to an illustrative implementation. The visual indicator 505 may appear responsive to a user taking an action on the content item 220. The visual indicator 505 can include a first content object 502 and a second content object 504. The first content object 502 can be of any shape or size but can be configured to fit within the second content object. For instance, the content object 502 is a circle that increases in size as the content item 220 (the collapsed version of the interactive ad) is moved closer to the target location. In some implementations, the target location to which to move the content item 220 to expand the interactive ad can be defined by the position of the visual indicator 505. The second content object 504 can be a circle that encloses the first content object 502. As the content item 220 is brought closer to the visual indicator 505, the first content object 502 gets larger.

Figure 5B:
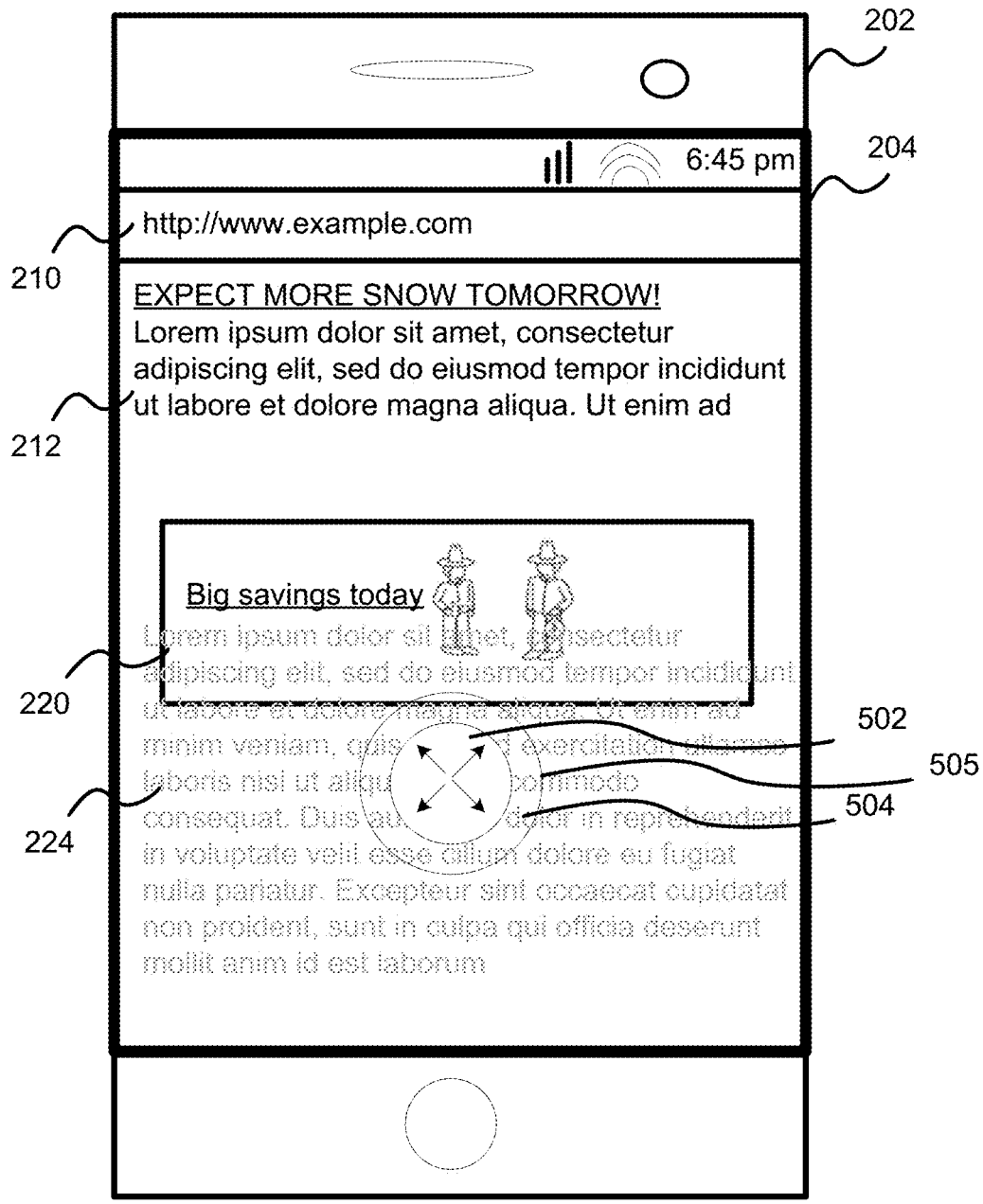
FIG. 5B is a front view of the computing device displaying the collapsed version of the interactive advertisement and the visual indicator in a second state, according to an illustrative implementation.
Figure 5C:
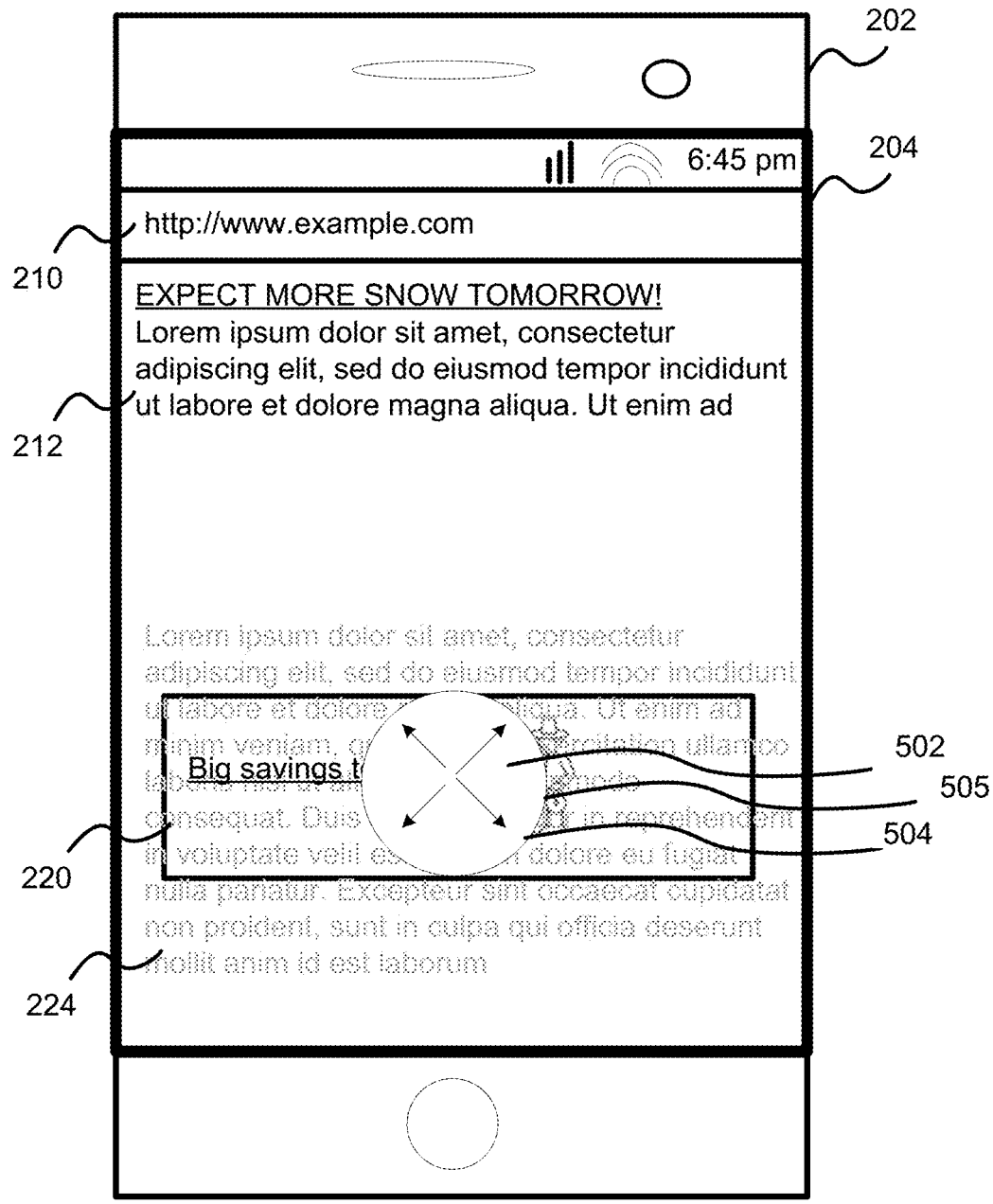
FIG. 5C is a front view of the computing device displaying the collapsed version of the interactive advertisement and the visual indicator in a third state, according to an illustrative implementation.
Figure 6D:
Figure 6E:

As shown in FIG. 5B, the content item 220 (collapsed version of the interactive advertisement) has moved closer to the visual indicator 505 and the size of the first content object 502 is larger in FIG. 5B relative to the size of the first content object 502 in FIG. 5A. As shown in FIG. 5C, the content item 220 is placed on top of the visual indicator 505 and the first content object 502 has increased to the size of the second content object 504 indicating that the content item has been moved to the appropriate location to expand the interactive ad. In some implementations, the interactive ad can be displayed responsive to the data processing system determining that the content item is placed on top of the visual indicator 505 regardless of whether the user has released the content item 220.

The interactive advertisement can be displayed in an advertisement slot or content slot of an information resource, such as a web page. In some implementations, a browser executing on a computing device of a user can receive a request to visit a particular webpage. The browser can then receive code pertaining to the webpage that is executed by the browser. The browser, via execution of the code, can display content included in the webpage. The code can include one or more scripts or functions for displaying ads. These scripts or functions can be referred to as ad slots.

Referring to FIGS. 6A-6F, FIGS. 6A-6F show blocks that include software code and comments for execution on a browser of a computing device on which to display one or more interactive ads.

When a user first visits a webpage, for instance, ww.exampleweather.com, the browser will load a page with the following markup language as shown in FIG. 6A:
<script type="text/javascript"
src="//pagead2.googlesyndication.com/pagead/show_ads.js">
</script>

The code can include a request to receive an ad (in this case, the ad request is show_ads.js). The ad request is configured to cause the browser to request another library from the ad server, which is referred to herein as expansion_embed.js. The ad request is configured to cause the browser to load the library into the browser in the context of the content publisher's webpage window as opposed to the context of the ad. The ad request can also be configured to cause the browser to request the ad from the ad server and receive an ad response from the ad server. The ad response can include an interactive ad. The interactive ad can include a collapsed version of the ad (collapsed content) and an expanded version of the ad (expanded content). The interactive ad can also include a visual indicator to which to move the collapsed content to cause the expanded content to be displayed. The ad request can cause the browser to insert the ad response received from the ad server into the DOM tree of the content publisher's web page. The ad response can be in the form of an iframe and serves as an ad container. In FIGS. 6B-6F, the ad response is labeled as the "CONTENT ADDED TO THE DOM BY SHOW_ADS."

If the ad is an expandable ad, the browser can make another request to the ad server to receive an expansion library. The ad server can provide the expansion library to the ad container corresponding to the ad response. The ad container expansion library included in the ad container can be configured to cause the browser to establish a communication channel with a corresponding webpage expansion library included within the DOM tree of the webpage but outside of the ad container. In some implementations, the ad container expansion library can be the same as the webpage expansion library (for instance, both libraries are expansion_embed.js). Different parts of the expansion library can be used inside the ad container and outside the ad container, and as such, the ad container expansion library and the webpage expansion library can be different as long as they are compatible.

The ad container can cause the browser to call the API function 'enableExpansion' on the ad container expansion library to establish a communication channel between the interactive ad included in the ad container and the ad container expansion library. In this way, the ad container expansion library can communicate signals to the interactive ad that can cause the interactive ad to render the expanded content or the collapsed content of the interactive ad, for example.

The ad container expansion library can establish a communication channel with the webpage expansion library. The webpage expansion library can have direct access to the DOM tree of the webpage of the content publisher, thereby allowing the webpage expansion library to cause the browser to perform various functions. For instance, the webpage expansion library can cause the browser to resize and reposition the interactive ad (during a drag/swipe expansion, or simply to render the expanded/collapsed views of the ad). The webpage expansion library can cause the browser to add elements to the webpage (such as the visual indicator, a swipe target or a semitransparent background overlay or a close button). The webpage expansion library can also cause the browser to receive, identify or otherwise listen to user interaction events that may occur on regions of the user interface that are not defined by the interactive ad.

The webpage expansion library and the ad container expansion library can communicate with each other as various events occur. For instance, for an interactive advertisement that incorporates a swipe-to-expand function, the following chain of events may occur. First, the ad container can call the enableExpansion functionality through an expandable API included in the ad container. The expandable API inside the ad container can send a "startExternalUserQualifier" (or some equivalent) signal to the expandable API of the content publisher's webpage that is outside the ad container. The expandable API of the content publisher's webpage can then add elements to the DOM tree of the content publisher's webpage that will be used to render the swipe-to-expand experience.

The expandable API of the content publisher's webpage can then position an overlay element exactly on top of a portion of the user interface that is defined by the ad and attaches user-touch listeners to the overlay element. The user-touch listeners can detect if a user touches the portion of the user interface that is defined by the ad included in the ad container. When the user clicks, taps, or otherwise touches or interacts with the region of the display corresponding to the ad, the overlay element intercepts the touch events and causes the browser to display design animations. In some implementations, the browser can set a timer on the initial touch such that if the user holds their finger on the ad for a time period longer than a threshold period, for example, 100 ms, the browser will determine that the swipe-to-expand feature has been actuated and display a swipe target. Once the overlay element determines that the swipe-to-expand feature has been actuated, the expandable API of the content publisher's webpage causes the browser to continue to listen for touchmove events (such as a drag, swipe, or other motion) and detects if the touchmove event is in the direction of the swipe target. The browser can also be configured to reposition the collapsed version of the ad in accordance with the touchmove event. The browser can detect that the touchmove event satisfies a threshold. For instance, the threshold can be when the collapsed version of the ad is moved to a target location. Upon detecting that the touchmove event has satisfied the threshold, the browser, via the expandable API of the content publisher's webpage, can resize the ad slot or the iframe associated with the ad container to an expanded size. In some implementations, the browser can then display an expanded version of the ad in the resized ad slot. The expandable API of the content publisher's webpage can communicate a message to the expandable API of the ad container that the region of the user interface associated with the ad container is expanded. The expandable API of the ad container calls a callback that the ad container provided to it in enableExpansion to signal that the interactive ad should expand. The ad container renders the expanded version of the ad (or expanded content) and hides the collapsed version of the ad (or collapsed content).

The expandable API of the content publisher's webpage can then receive an indication via the user interface to collapse the expanded content. In some implementations, the user can click on an icon to collapse the expanded content item. In some implementations, the user can touch a portion of the user interface outside of the region defined by the ad container. In some implementations, the user can perform a swipe to dismiss gesture. The expandable API of the content publisher's webpage can then restore the ad slot to its original collapsed position and sends a "collapse" message to the expandable API of the ad container. The expandable API of the ad container can then call a callback that the ad container provided to it in enableExpansion to signal that the ad slot should collapse. The expandable API of the ad container then displays the collapsed content and hides the expanded content.

The present disclosure describes interactive ads configured to reduce inadvertent clicks on ads. Users can interact with the interactive ads by performing one or more gestures, such as performing a swipe gesture, on the ad. With respect to FIGS. 2A-6F, the interactive ads described included a first content object, a second content object and a target object identifying a location on the display screen to which to move the first content object to cause the ad to expand and display the second content object.

Another interactive ad mechanism can involve an interactive ad including a first content object and a second content object. In this mechanism, the second content object can be displayed in response to a user performing a first predetermined swipe gesture on the first content object. If the user performs a second predetermined swipe gesture on the first content object, the content slot in which the interactive ad appears can be removed from the information resource on which it is displayed or a third content object is displayed in place of the first object. In some implementations, the third content object can be a first content object of another interactive ad. In some implementations, the third content object can be a survey or questionnaire relating to the interactive ad on which the second predetermined swipe gesture was performed.

In some implementations, responsive to the user initiating an interaction with the interactive ad, the interactive ad can display an animation indicating that the first content object of the interactive ad can be swiped in a first predetermined direction (for example, a right swipe) or a second predetermined direction (for example, a left swipe). In some implementations, responsive to the user performing a right swipe on the first content object of the interactive ad, the computing device can render the second content object of the interactive ad (which can represent an expanded version of the interactive ad). Conversely, responsive to the user performing a left swipe on the first content object of the interactive ad, the computing device can render a first content object of another interactive ad, or a third content object through which the user can provide feedback regarding the interactive ad.

It should be appreciated that by providing the user the ability to dismiss ads, multiple ads can be displayed in a single page impression. Further, allowing a user to dismiss ads can provide valuable feedback to advertisers and advertising selection entities that can help select more relevant ads for the user in the future. Moreover, user behavior can be analyzed and tracked based on the rate of dismissing ads (or interacting with interactive ads in general) to further improve the relevancy of ads shown to users.

In some implementations, the interactive ad can include an animation or graphic indicating the directions in which the ad can be swiped. This animation or graphic can be displayed in response to the computing device detecting that the user has touched (clicked, tapped, or otherwise engaged with) the ad. In some implementations, the animation or graphic can be displayed as an overlay over the ad negating the need for the user to touch the ad. In some implementations, the swipe gestures may have predetermined thresholds. For instance, the speed at which the user swipes the ad may exceed a predetermined threshold to be considered a swipe. Similarly, the distance between the portion of the screen where the user initiated the swipe gesture to the portion of the screen where the user ended the swipe gesture may exceed a predetermined threshold to be considered a swipe. In some implementations, the speed and/or distance of the swipe gesture may be used to differentiate between multiple actions to be taken on the interactive ad. For example, a slow left swipe may generate a request to hide or otherwise remove the ad slot, while a fast left swipe may generate a request to display another interactive ad.

The present disclosure also describes systems and methods for providing interactive advertisements. A computing device including one or more processors can provide, for display, a first content object of an interactive advertisement in a content slot of an information resource. The interactive ad can include a second content object configured for display responsive to a first predetermined gesture on the first content object. The computing device can identify a region defined by one or more boundaries of the content slot. The computing device can receive, via a touchscreen interface of the computing device, an action performed on the touchscreen interface that is initiated in an area of the touchscreen interface that corresponds to the identified region defined by one or more boundaries of the content slot. The computing device can determine that the action corresponds to the first predetermined gesture and provide for display, responsive to determining that the action corresponds to a first predetermined gesture, the second content object instead of the first content object.

Referring again to FIG. 1, the interactive advertisement generation module 130 can be configured to generate at least one interactive advertisement that includes a first content object and a second content object. The interactive advertisement can include a script, code, or other executable, that can enable a user to interact with the advertisement. In some implementations, the first content object can be a collapsed version of the interactive ad and is sized to fit within a content slot defined in a resource (such as a page of a mobile application or a web page of a browser). The second content object can be an expanded version of the interactive ad.

The interactive advertisement generation module 130 can be configured to generate the interactive advertisement using one or more computing languages. In some implementations, the interactive advertisement generation module 130 may utilize one or more libraries of functions. In some implementations, the interactive advertisement generation module 130 can be configured to generate an interactive advertisement configured to be selected for display in an ad slot. In some implementations, the ad slot can be included within an information resource, such as a web page. In some implementations, the ad slot can be included as an interstitial ad of a mobile application executing on a mobile device, such as a tablet or smartphone.

The interactive advertisement generation module 130 can be configured to create a script or programming code, which when executed by a computing device on which the interactive advertisement is served, performs functionality to allow a user to interact with the interactive ad. In some implementations, the interactive advertisement includes code that displays a first content object in an ad slot and in response to detecting that a first predetermined gesture or action is performed on the first content object, provides the second content object for display on the computing device. In some implementations, the second content object can be an expanded version of the first content object. The second content object can be provided for display as an overlay over the content displayed on the computing device when the first predetermined gesture was performed. In some implementations, the second content object can be displayed as an interstitial page.

The first predetermined gesture can include a gesture performed by the user. In some implementations, the gesture can be performed on the first content object. In some implementations, the gesture can be performed in a region defined by the content slot within which the first content object is displayed. The first predetermined gesture can include a right swipe or a left swipe. In a right swipe, a user can initiate the gesture at a first position of the display of the computing device and terminate the gesture at a second position of the display that lies to the right of the first position. In some implementations, the distance between the first position and the second position may be greater than a predetermined minimum distance. In some implementations, for the gesture to qualify as the first predetermined gesture, the speed at which the gesture is performed may be required to exceed a predetermined speed threshold. In some implementations, the speed at which the gesture is performed can be determined by determining a length of time from a first time at which the gesture was initiated (for example, when the user first touched the display) to a second time at which the gesture was terminated (for example, when the user is no longer in contact with the display). In some implementations, the speed at which the gesture is performed corresponds to the ratio between the distance between a first area on the display where the user initiated the gesture to a second area on the display where the user terminated the gesture to the determined length of time.

Conversely, the second predetermined gesture can include left swipe or a right swipe based on whether the first predetermined gesture is a right swipe or a left swipe. In some implementations, the first and second predetermined gestures may be swipes in any particular direction. In some implementations, the predetermined gestures can be gestures or other actions performed on the display that are initiated on the region of the display defined by the ad slot. By taking an action on the region of the display defined by the ad slot, the computing system can determine that the action is pertaining to the ad displayed in the ad slot as opposed to other content displayed on the screen. In some implementations, the predetermined gestures can be a combination of one or more gestures. In some implementations, the predetermined gestures may include multiple touches. In some implementations, the predetermined gestures may be performed by a single contact (for example, using one finger). In some other implementations, the predetermined gestures may be performed by multiple contacts simultaneously (for example, using multiple fingers).

In some implementations, the interactive advertisement includes code that causes the computing device to display the first content object in an ad slot. The code can be configured to cause the computing device to resize the first content object to fit within the ad slot. In some implementations, the code can cause the computing device to display one or more additional graphics with the first content object. The additional graphics can include one or more animations describing how to interact with the first content object. In some implementations, the graphics can include a text object identifying a type of interactive ad to which the first content object corresponds (for example, a swipe to expand ad).

The code can be configured to cause the computing device to identify a boundary of the ad slot and identify if a user performs an action or gesture in a region of the display that is within the boundary of the ad slot. The code can be configured to cause the computing device to identify if at least a portion of the action or gesture matches one of the predetermined gestures. The code can be configured to cause the computing device to display the second content object of the interactive ad responsive to identifying that at least a portion of the action or gesture matches the first predetermined gesture. In some implementations, the code can be configured to cause the computing device to display the second content object in a second ad slot displayed as an overlay. In some implementations, the code can be configured to cause the computing device to launch an application to display the second content object. In some implementations, the code can be configured to cause the computing device to prompt the user of the computing device to select an application on which to display the second content object. Responsive to receiving an action from the user, the computing device can display the second content object on the application selected by the user.

The code can be configured to cause the computing device to identify if a gesture satisfies or otherwise corresponds to a second predetermined gesture. If the computing device determines that the gesture satisfies or otherwise corresponds to the second predetermined gesture, the computing device can replace the first content object of the interactive ad with another first content object of another interactive ad. In some implementations, the computing device can receive a plurality of interactive ads from the data processing system 110. In some implementations, the data processing system 110 can select multiple interactive ads responsive to a single request for an interactive ad.

In some implementations, the interactive advertisement includes code that causes the computing device to display the first content object in an ad slot and in response to detecting that a second predetermined gesture or action is performed on the first content object, causes the computing device to display a first content object of a second interactive ad. In some such implementations, the computing device can receive a second interactive ad from the advertisement selection module 135 of the data processing system 110. In some implementations, the advertisement selection module 135 can be configured to identify a plurality of interactive ads to display in the ad slot and provide, to the computing device, the plurality of interactive ads. In this way, responsive to the computing device identifying that the second predetermined gesture is performed on the interactive ad provided for display, the computing device can present a new interactive ad for display within the same ad slot. In this way, instead of the data processing system 110 having to receiving multiple ad requests and perform multiple ad auctions, the data processing system 110 can select and provide multiple interactive ads to the computing device responsive to a single ad request.

In some implementations, the computing device can be configured to submit a request to receive an interactive ad to the data processing system 110. In some implementations, the data processing system 110 can, responsive to determining that the request for content is a request for an interactive ad, the data processing system 110 can be configured to select a predetermined number of interactive ads to provide to the computing device. The data processing system 110 can select the predetermined number of interactive ads based on one or more content selection parameters that are based in part on information associated with the computing device, the user of the computing device, the type of computing device, and other information that may be used to select ads relevant to the user at the time of the request.

In some implementations, the computing device can receive a plurality of interactive ads from the data processing system 110 responsive to the request for interactive content and the computing device can store the plurality of interactive ads. In some implementations, the ads can be stored in a cache of a browser or application of the computing device.

In some implementations, the code can be configured to cause the computing device to replace the first content object of the interactive ad with a third content object of the interactive ad responsive to determining that the gesture satisfies or otherwise corresponds to the second predetermined gesture. The third content object can be a survey, questionnaire or other content object that includes one or more input fields via which the user of the computing device can provide input. In some implementations, the third content object can be configured to receive feedback from the user regarding the interactive ad. In some implementations, the feedback can be related to one or more reasons for why the user didn't want to expand the ad. In some implementations, the third content object can be unrelated to the interactive ad. For instance, the third content object can be an input form requesting information about a product or service unrelated to a product or service associated with the interactive ad.

In some implementations, the third content object can be a part of the interactive ad and can include one or more actionable items to receive feedback from the user of the computing device. In some implementations, the third content object can be a form, survey, or questionnaire. In some such implementations, the survey or questionnaire can ask a question relating to the first content object, the interactive ad, the advertiser associated with the interactive ad or one or more products or services identified by the interactive ad. The code can be configured to identify one or more actions taken on the third content object and provide, to the data processing system 110, a response identifying the action taken by the third content object.

In some implementations, the data processing system 110 can store the response and use the information included in the response to update advertisement selection parameters for the particular computing device. In some implementations, the data processing system 110 can store the response and use the information included in the response to update advertisement selection parameters for the particular content item. In some implementations, the advertisement selection parameters can include one or more rules, statistics, or characteristics that may influence the selection of a particular content item.

In some implementations, the code can be configured to cause the computing device to hide the ad slot in which the first content object is displayed responsive to determining that the gesture satisfies or otherwise corresponds to the second predetermined gesture. By hiding the ad slot, content on the information resource previously shown below the ad slot can be adjusted such that the content appears in the region previously displaying the ad slot.

The code can be configured to monitor the gestures performed on an interactive ad. The code can be configured to store, for each interactive ad displayed in the ad slot, a type of gesture performed on the interactive ad. In some implementations in which the computing device can display a content object in which a user can provide feedback or input, the code can be configured to receive the feedback or input. The code can be configured to collect the information corresponding to gestures performed on the content objects or interactive ads and provide the information to the data processing system 110. The data processing system 110 can utilize this information to determine one or more performance metrics associated with the interactive ads as well as learn more about the user of the computing device and the interactive ads they may be interested in.

The data processing system 110 can be configured to receive gesture-based information from the interactive ad provided to the computing device for display. The data processing system 110 can be configured to maintain a database including a plurality of entries, each of which can correspond to a gesture performed by a user on the interactive ad. For instance, each time the data processing system 110 provides an interactive ad for display to a computing device, the data processing system 110 can receive, from the computing device, information relating to one or more gestures performed on the interactive device. The interactive ad, via the code, can cause the computing device to identify gestures performed on the interactive ad and provide, to the data processing system 110, information relating to the gestures. Each entry can identify an identifier associated with a user of the computing device or the computing device itself, a type of gesture performed, an ad identifier identifying the interactive ad, among others.

As described above, the advertisement selection module 135 can select an interactive ad, such as the interactive ad shown in FIGS. 7A-7G for display on the computing device. In some implementations, the advertisement selection module 135 can be configured to select the interactive ad based on determining a type of device on which the ad is to be served. In some implementations, the advertisement selection module 135 can select the interactive ad in response to determining that the computing device on which to serve the ad includes a touch screen interface.

In some implementations, the advertisement selection module 135 provides the selected interactive ad to the computing device for display in an ad slot of an information resource corresponding to a content publisher. The interactive ad can be generated by a content provider. In some implementations, the data processing system can generate the interactive advertisement using content items received from the content publisher. In some implementations, the computing device can request to receive the interactive ad in response to identifying an ad slot. In some implementations, the computing device can identify an ad slot in an information resource displayed on a browser executing on the computing device or an ad slot in a mobile application executing on the computing device.

The computing device can be configured to display the first content object corresponding to a collapsed version of the interactive advertisement. The computing device can, via a browser or other application executing on the computing device, display the first content object in an ad slot. The first content object can include an image displayed within a boundary defined by the ad slot in which the interactive advertisement is displayed. The first content item can be displayed in an ad slot defined in or provided along with an information resource. In some implementations, the computing device can provide, for display, a call to action indicating a manner in which to expand the collapsed version of the interactive ad to the expanded version of the ad. In some implementations, the call to action can be displayed within the ad slot. In some implementations, the call to action can be displayed adjacent to the ad slot. In some implementations, the call to action can include instructions on how to trigger a conversion of the interactive ad.

Figure 7A:
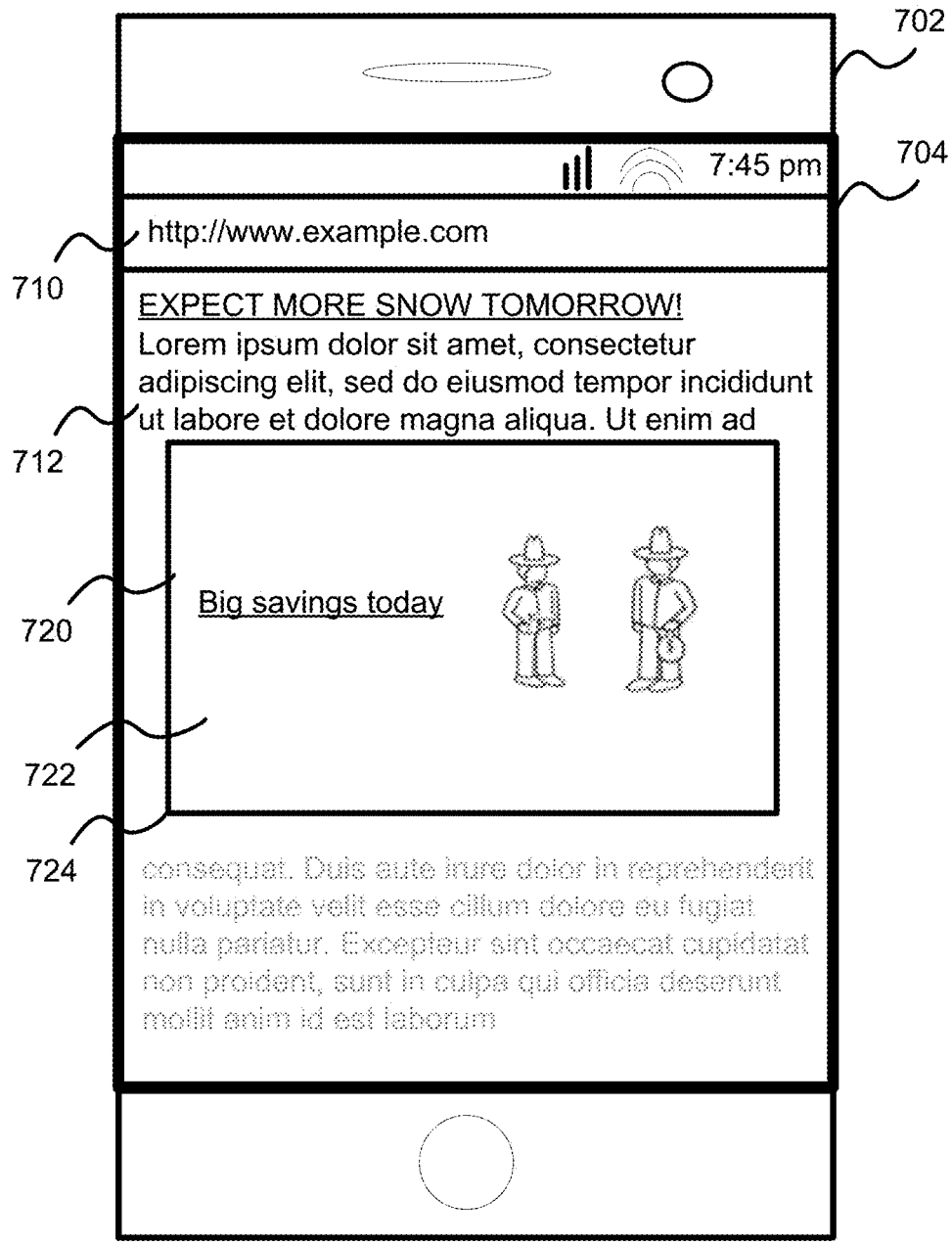
FIG. 7A is a front view of a computing device displaying a collapsed version of an interactive advertisement, according to an illustrative implementation.

Referring now to FIG. 7A, FIG. 7A is a front view of a computing device displaying a collapsed version of an interactive advertisement. The computing device 702 includes a display screen 704. The display screen can be a touch screen configured to receive input from a user via touch. A browser is executing on the computing device 702 and the browser is displaying an information resource 710. The information resource 710 includes primary content 712 provided by the content publisher of the information resource 710 and an ad slot 724 in which an interactive advertisement, such as the interactive ad 720 is displayed. As shown in FIG. 7A, the first content object 722 of the interactive ad 720 is displayed.

Figure 7B:
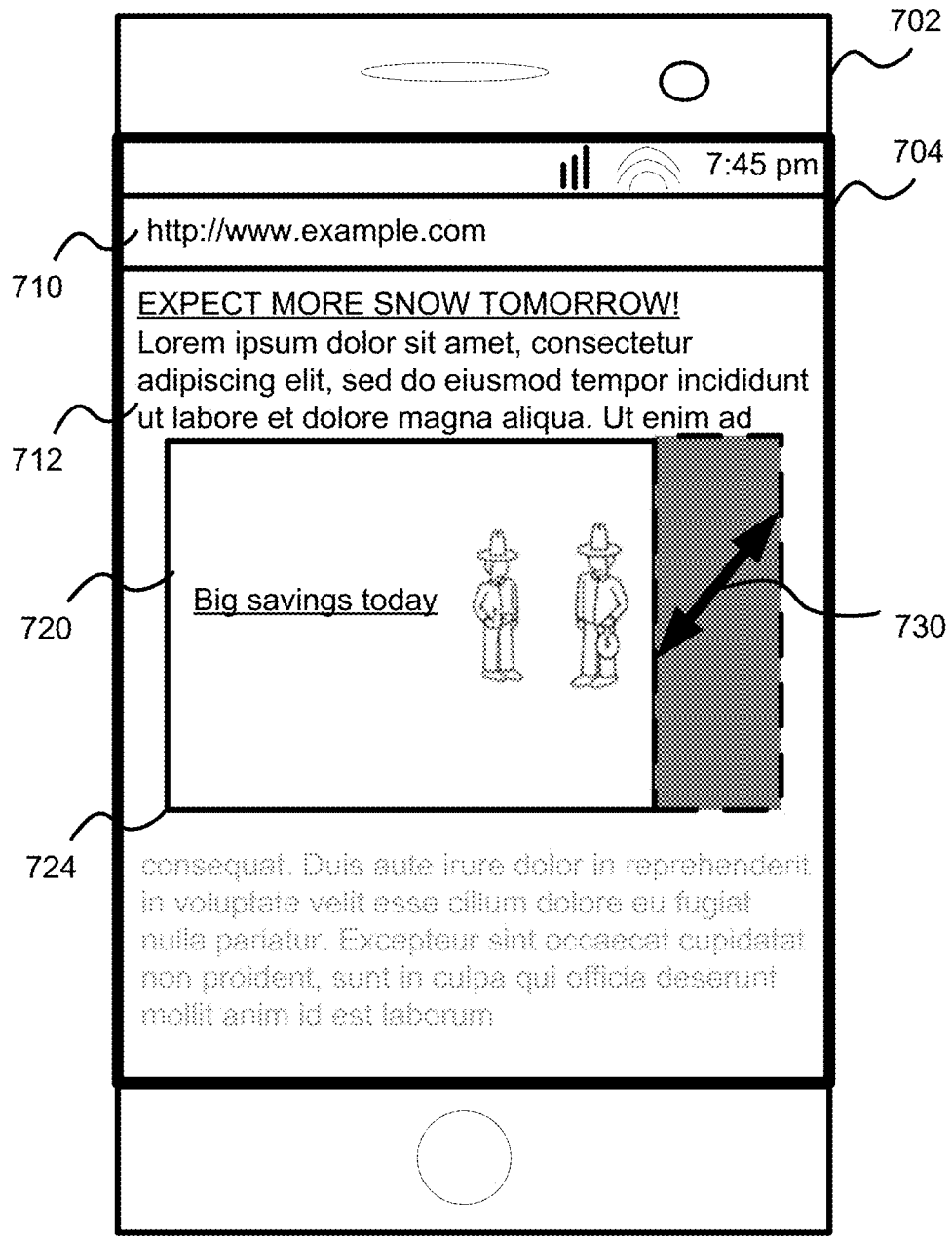
FIG. 7B is a front view of the computing device displaying the collapsed version of the interactive advertisement and an indicator corresponding to a first gesture, according to an illustrative implementation.

Referring now to FIG. 7B, FIG. 7B is a front view of the computing device displaying the collapsed version of the interactive advertisement and an indicator corresponding to a first gesture. As shown in FIG. 7B, responsive to the computing device 702 detecting a touch or action in an area of the display 704 defined within the ad slot 724, the computing device can display an indicator demonstrating that the ad can be expanded. In some implementations, the indicator can be displayed responsive to the computing device determining that the user is in the process of performing a first predetermined gesture, such as a right swipe.

Figure 7C:
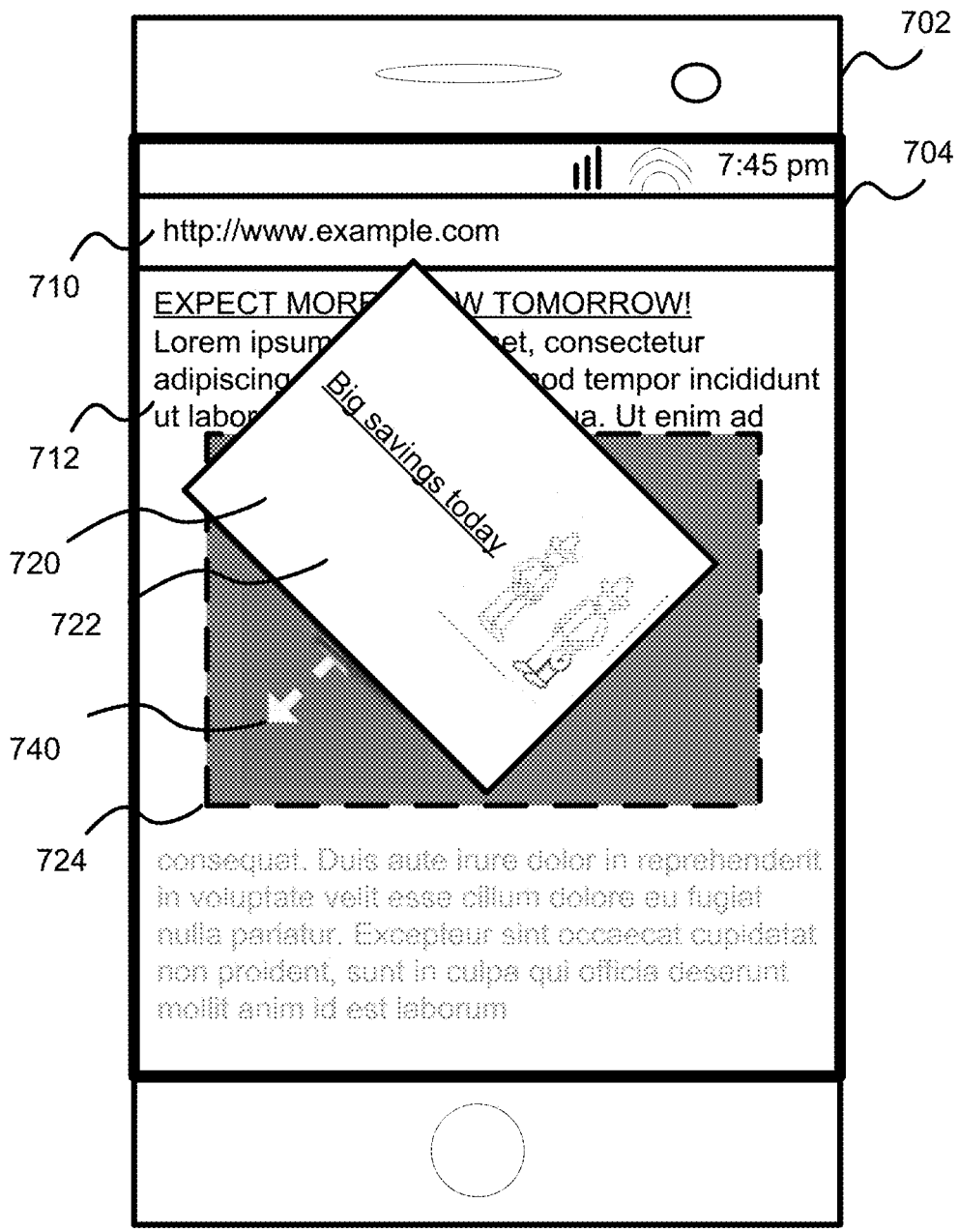
FIG. 7C is a front view of the computing device displaying the collapsed version of the interactive advertisement transitioning to an expanded version of the interactive advertisement and an indicator corresponding to the first gesture, according to an illustrative implementation.

Referring now to FIG. 7C, FIG. 7C is a front view of the computing device displaying the collapsed version of the interactive advertisement transitioning to an expanded version of the interactive advertisement and an indicator corresponding to the first gesture. Responsive to the computing device determining that the user has performed the first predetermined gesture, the computing device can display an animation representing that the user successfully caused the interactive ad to display an expanded view of the interactive ad. The first content object 722 is rotated as it is removed from the display and the visual indicator 740 represents that the gesture performed by the user was sufficient to be treated as the first predetermined gesture.

Figure 7D:
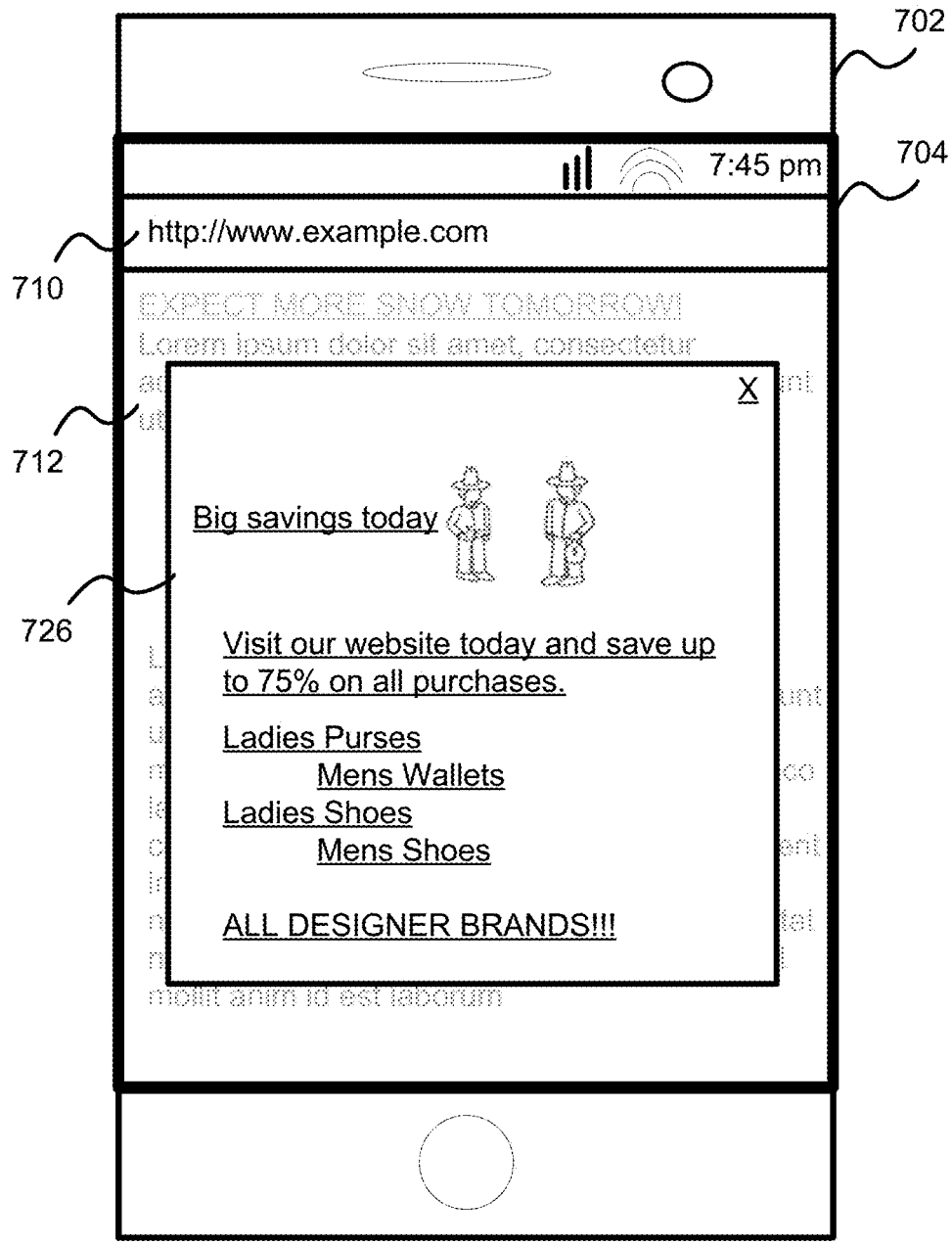
FIG. 7D is a front view of the computing device displaying an expanded version of the interactive advertisement, according to an illustrative implementation.

As shown in FIG. 7D, FIG. 7D is a front view of the computing device displaying an expanded version of the interactive advertisement. As shown in FIG. 7D, the expanded version of the interactive advertisement corresponds to displaying the second content object 726 of the interactive ad. The second content object can be displayed as an overlay to the primary content 712. The second content object can be inserted within a second ad slot displayed as an overlay to the primary content 712. In some implementations, the second content object 726 can be displayed as a floating ad, an interstitial ad or in some other manner.

Figure 7E:
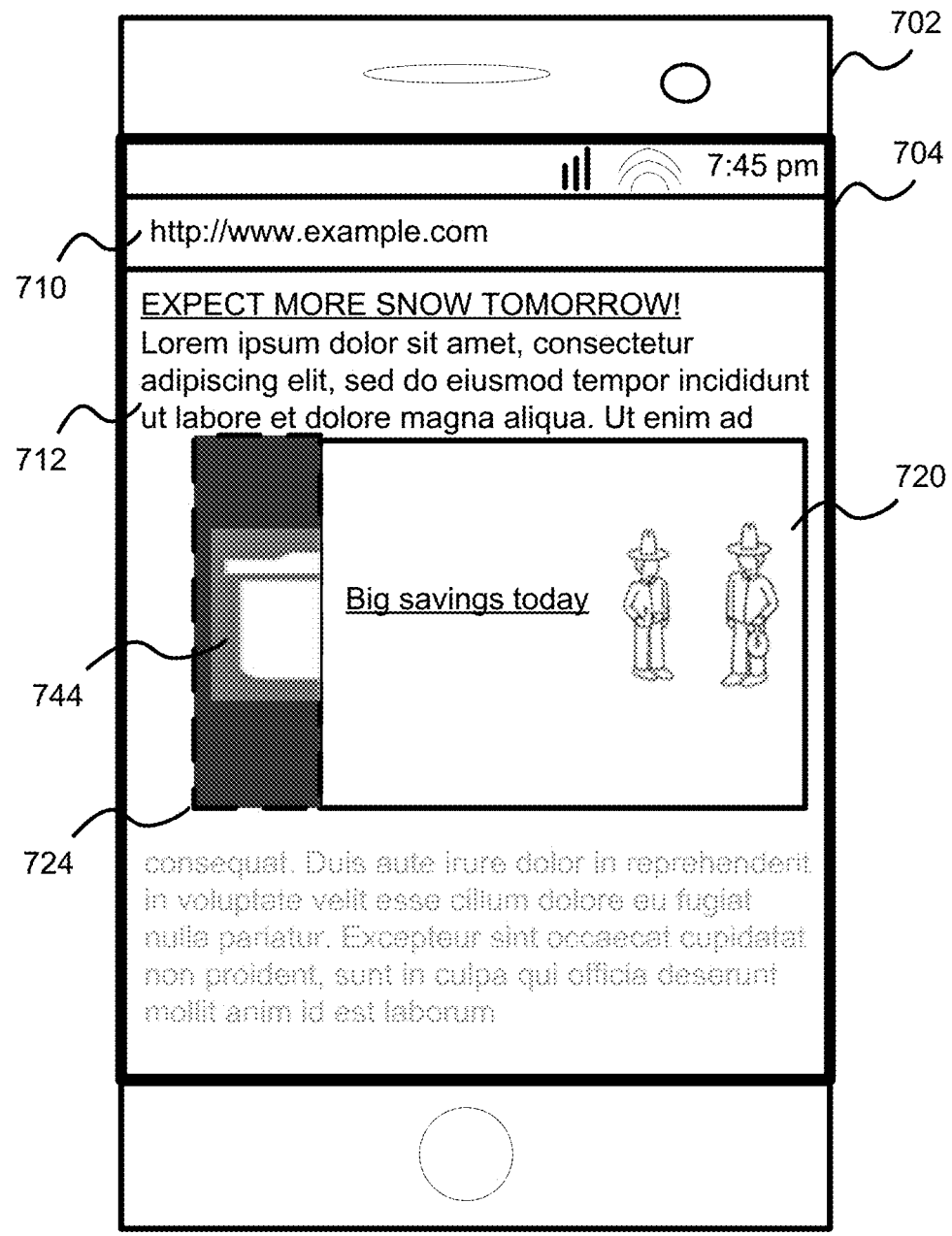
FIG. 7E is a front view of the computing device displaying the collapsed version of the interactive advertisement and an indicator corresponding to a second gesture, according to an illustrative implementation.

As shown in FIG. 7E, FIG. 7E is a front view of the computing device displaying the collapsed version of the interactive advertisement and an indicator corresponding to a second gesture. As shown in FIG. 7E, responsive to the computing device 702 detecting a touch or action in an area of the display 704 defined within the ad slot 724, the computing device can display an indicator demonstrating that the ad can be removed, dismissed, or replaced. In some implementations, the indicator 744 can be displayed responsive to the computing device determining that the user is in the process of performing a second predetermined gesture, such as a left swipe.

Figure 7F:
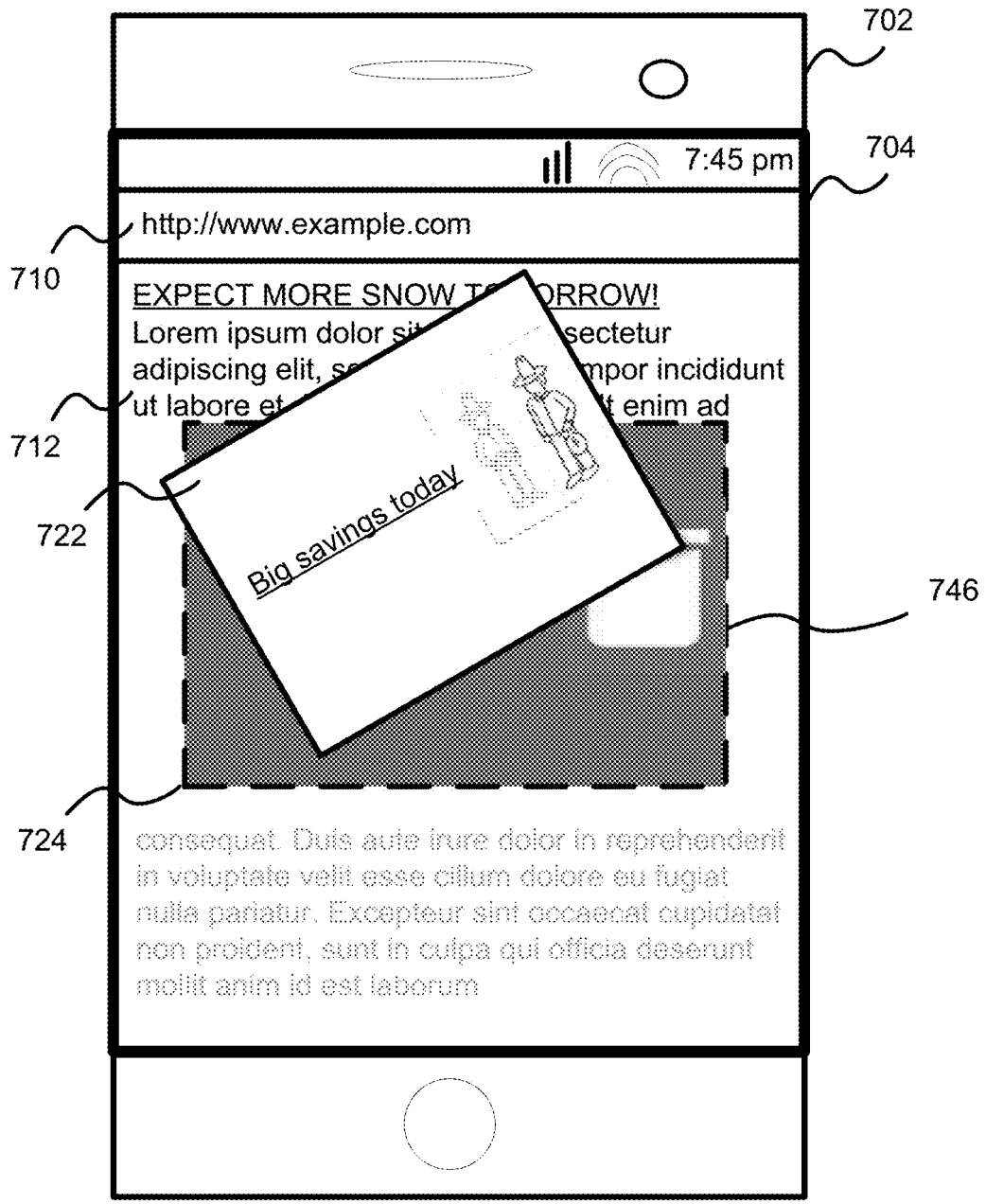
FIG. 7F is a front view of the computing device displaying the collapsed version of the interactive advertisement being removed from the display and an indicator corresponding to the second gesture, according to an illustrative implementation.

As shown in FIG. 7F, FIG. 7F is a front view of the computing device displaying the collapsed version of the interactive advertisement being removed from the display and an indicator corresponding to the second gesture. Responsive to the computing device determining that the user has performed the second predetermined gesture, the computing device 702 can display an animation representing that the user successfully caused the interactive ad to remove the interactive ad 720 from the ad slot 724. The first content object 722 is rotated as it is removed from the display and the visual indicator 746 represents that the gesture performed by the user was sufficient to be treated as the second predetermined gesture.

Figure 7G:
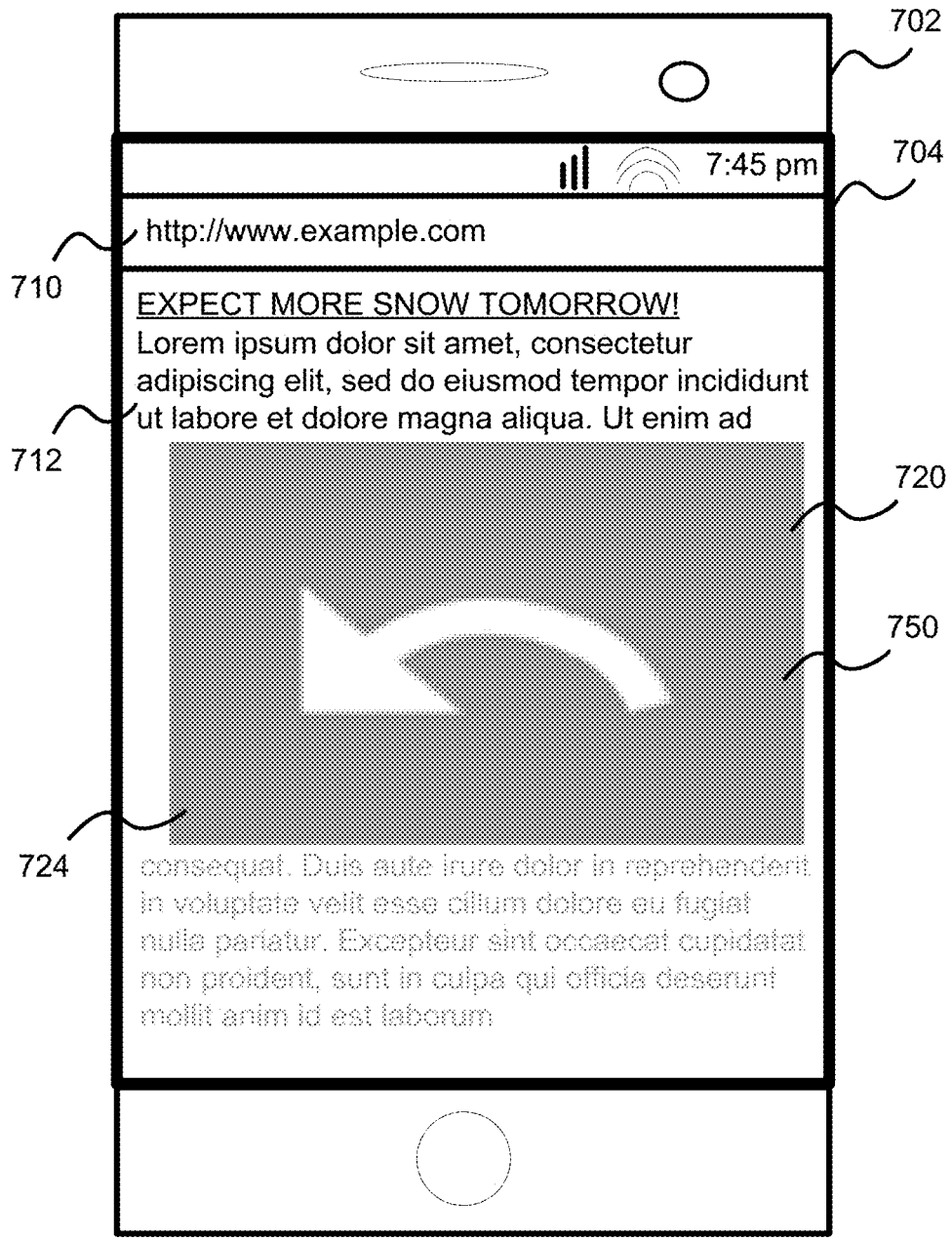
FIG. 7G is a front view of the computing device displaying a third content object indicating that the interactive ad has been dismissed, according to an illustrative implementation.

As shown in FIG. 7G, FIG. 7G is a front view of the computing device displaying a third content object indicating that the interactive ad has been dismissed, according to an illustrative implementation. In some implementations, responsive to the user performing the second predetermined gesture, the computing device can display a third content object, such as object 750. This object can be used to indicate to the user that the ad has previously been dismissed by the user. In some implementations, the user may swipe across the content object 750 to display the same interactive ad or to display a new interactive ad. In some implementations, responsive to the user performing an action on the object 750, the computing device can transmit to the data processing system 110, a request to receive a new interactive ad.

Figure 7H:
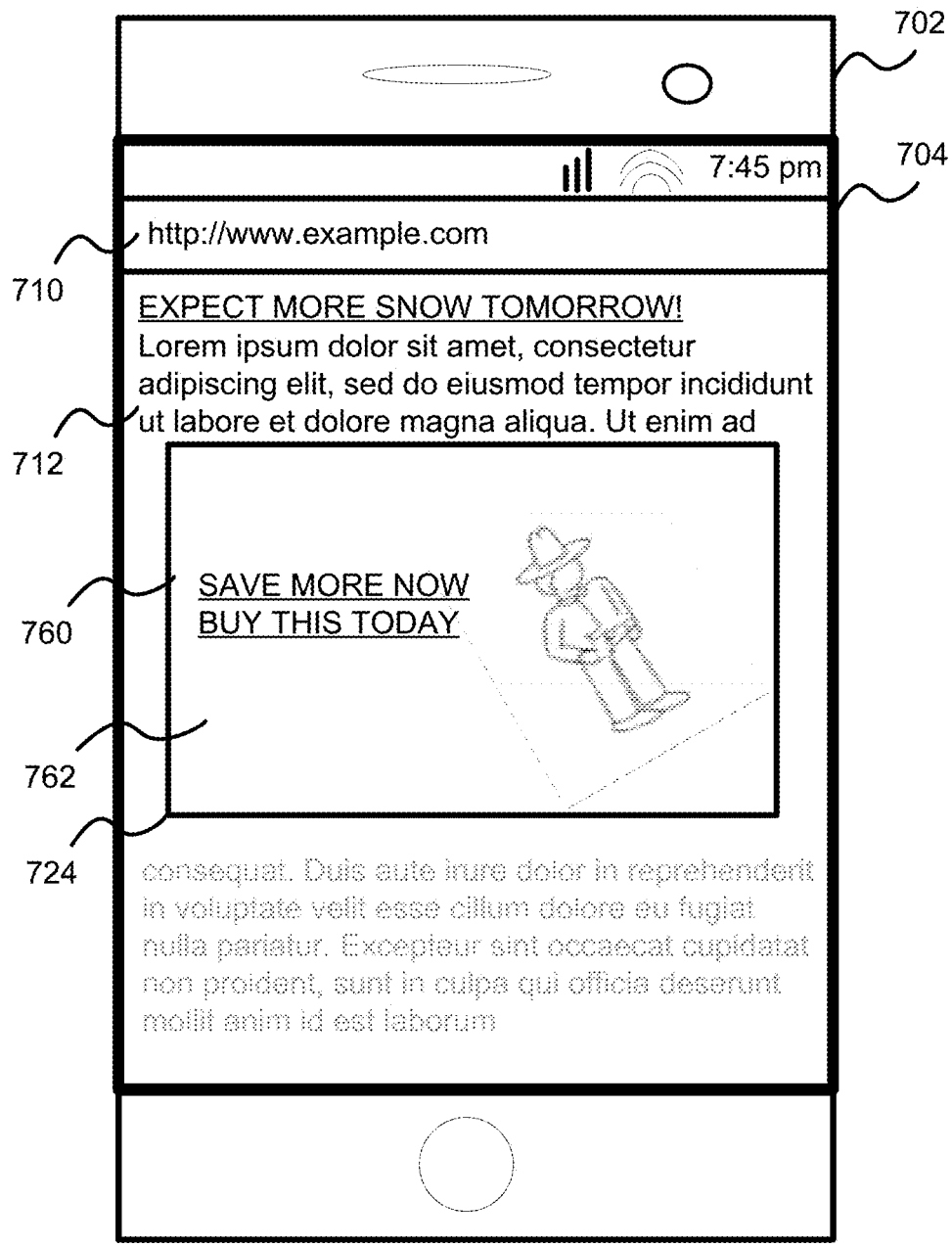
FIG. 7H is a front view of the computing device displaying a second interactive ad responsive to the computing device removing the interactive ad shown in FIG. 7F, according to an illustrative implementation.

As shown in FIG. 7H, FIG. 7H is a front view of the computing device displaying a second interactive ad responsive to the computing device removing the interactive ad shown in FIG. 7F. The display 704 of the computing device 702 can display a new interactive object 760 including a first content object 762 that is displayed within the ad slot 724. In some implementations, the computing device 702 can display the first content object 762 of the new interactive object 760 responsive to a user performing the second predetermined gesture on the first content object 722 of the interactive ad 720 shown in FIG. 7A.

Figure 7I:
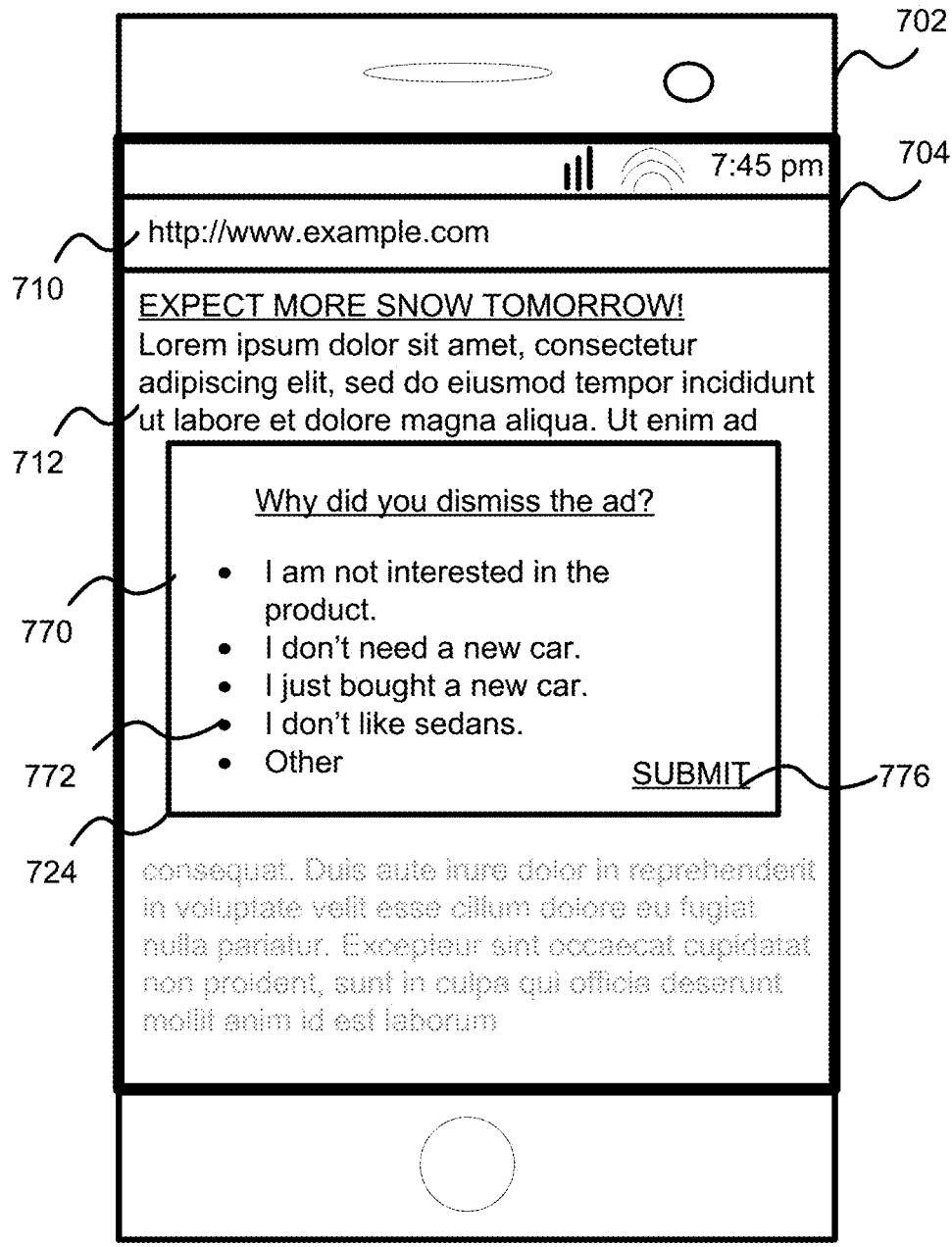
FIG. 7I is a front view of the computing device displaying a third content object including a form for receiving feedback from the user of the computing device, according to an illustrative implementation.

As shown in FIG. 7I, FIG. 7I is a front view of the computing device displaying a third content object including a form for receiving feedback from the user of the computing device. The display 704 of the computing device 702 can display the third interactive object 770 including a first content object 762 that is displayed within the ad slot 724. In some implementations, the computing device 702 can display the third content object 770 of the new interactive object 760 responsive to a user performing the second predetermined gesture on the first content object 722 of the interactive ad 720 shown in FIG. 7A. The third content object 770 can include a form that includes selection items, such as item 772. The third content object 770 can include one or more questions relating to the interactive ad 720 on which the second predetermined gesture was performed. In some implementations, the third content object 770 can also include a submission item through which the user can submit their response. Responsive to the user submitting their response, the computing device 702 can transmit the response to the data processing system 110. In some implementations, responsive to the user submitting the response, the computing device can display one of the content object 750 shown in FIG. 7G or a new interactive ad, such as the content object 762 of the interactive ad 760 shown in FIG. 7H.

Figure 8:
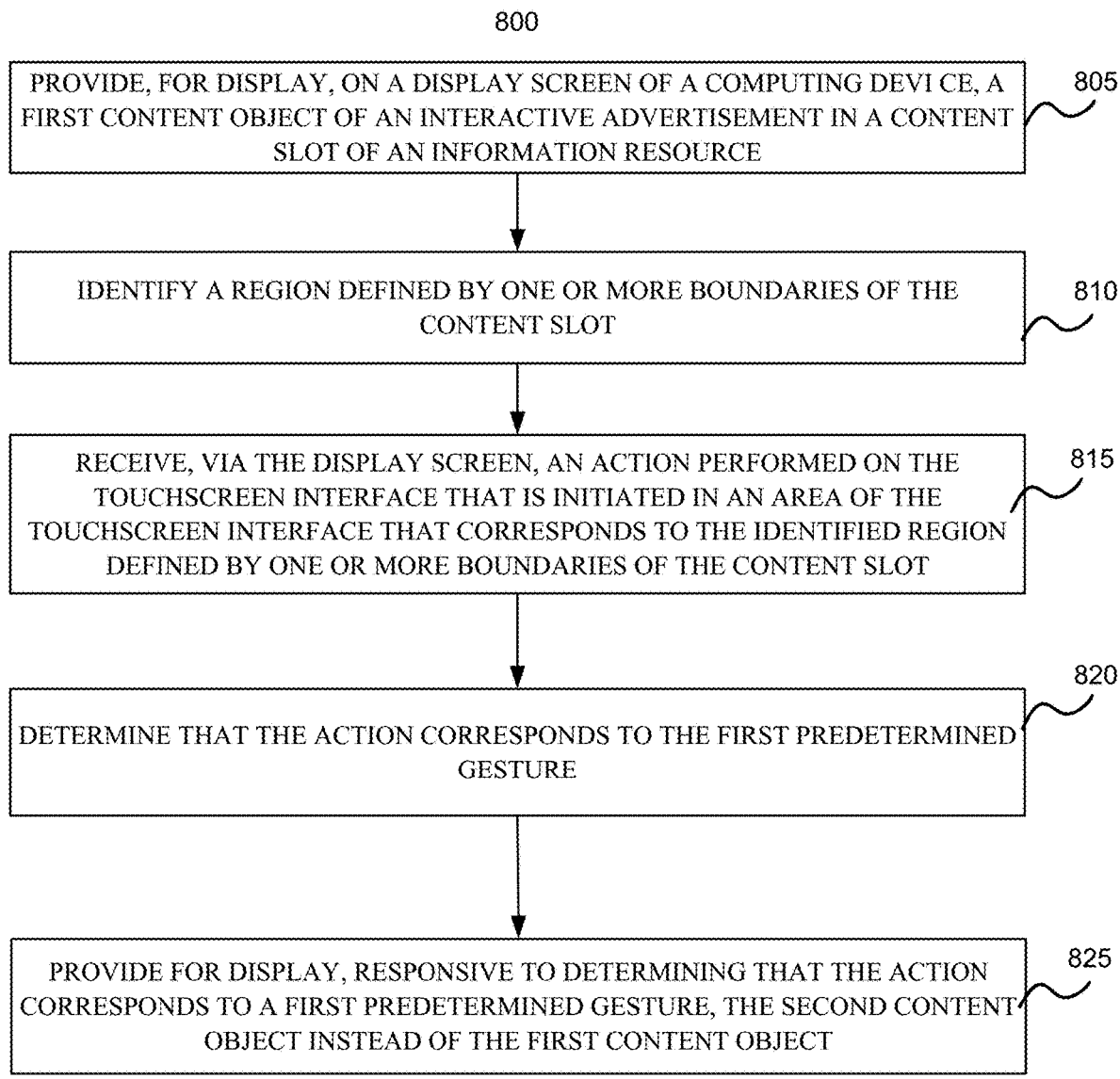
FIG. 8 is a flow diagram depicting a method of providing an interactive advertisment, according to an illustrative implementation.

FIG. 8 is a flow diagram depicting a method of providing an interactive advertisement. A computing device including one or more processors can provide, for display, a first content object of an interactive advertisement in an ad slot of an information resource (BLOCK 805). The interactive ad can include a second content object configured for display responsive to a first predetermined gesture on the first content object. The computing device can identify a region defined by one or more boundaries of the ad slot (BLOCK 810). The computing device can receive, via a touchscreen interface of the computing device, an action performed on the touchscreen interface that is initiated in an area of the touchscreen interface that corresponds to the identified region defined by one or more boundaries of the ad slot (BLOCK 815). The computing device can determine that the action corresponds to the first predetermined gesture (BLOCK 820). The computing device can then provide for display, responsive to determining that the action corresponds to a first predetermined gesture, the second content object instead of the first content object (BLOCK 825).

In further detail, the computing device can provide, for display, a first content object of an interactive advertisement in an ad slot of an information resource (BLOCK 805). The interactive ad can include a second content object configured for display responsive to a first predetermined gesture on the first content object. The computing device can provide the interactive ad to a computing device from which a request for content is received. In some implementations, the computing device can request to receive an ad responsive to receiving an information resource that includes an ad slot. The ad slot can be configured to initiate a request to an ad serving system to receive an ad. The ad slot can be configured to request an interactive ad. In some implementations, the ad serving system can select an interactive ad for display in response to the request for an ad. In some implementations, the interactive ad can be selected in response to determining that the ad is from a computing device including a touch screen interface. In some implementations, the interactive ad can be selected in response to determining that the ad is from a computing device including a display screen. In some implementations, the information resource is a page that can be displayed on one of a browser or a native application installed on the computing device. The information resource can include one or more primary content items provided by a content publisher of the information resource.

The interactive ad can include a first content object, a second content object and a script or programmable code. The first content object can be a collapsed version of the interactive ad, while the second content object can be an expanded version of the interactive ad. In some implementations, the first content object can be displayed within the ad slot, while the second content object can be displayed within another ad slot or as an overlay over the ad slot.

In some implementations, the computing device can receive a plurality of interactive ads in response to a single request for an ad. By doing so, the computing device can display multiple interactive ads responsive to the user dismissing one or more of the interactive ads. The computing device can store the plurality of interactive ads in a cache responsive to receiving them. The plurality of interactive ads may be associated with an order according to which to present the interactive ads. In some implementations, the ad selection system can determine the order in which to present the interactive ads based on a ranking of the ads. The ads can be ranked based on one or more of relevance as well as bid prices.

The first content object can be an image or graphic displayable within an ad slot of an information resource. The computing device can display the first content object in the ad slot. In some implementations, the computing device can display one or more visual animations, graphics or objects indicating that the first content object can be interacted with. In some implementations, the computing device can provide an animation indicating that two possible predetermined gestures, if performed on the content object, will result in an action by the computing device. In some implementations, the computing device can be configured to display a first animation responsive to the user initiating an action on the first content object. In some implementations, the computing device can display a first animation indicating a right swipe responsive to the user initiating a right swipe action on the first content object. In some implementations, the computing device can display a second animation indicating a left swipe responsive to the user initiating a left swipe action on the first content object.

The computing device can identify a region defined by one or more boundaries of the ad slot (BLOCK 810). In some implementations, the computing device can identify the region defined by the boundaries of the ad slot by analyzing the information resource. In some implementations, the computing device can identify the boundaries of the information resource based on the HTML code, source code, DOM tree, or other programmable language code used to render the information resource on the computing device. The computing device can then identify, from the boundaries of the ad slot, if a user performs an action, gesture or other interaction on or within the boundaries of the ad slot.

The computing device can receive, via a touchscreen interface of the computing device, an action performed on the touchscreen interface that is initiated in an area of the touchscreen interface that corresponds to the identified region defined by one or more boundaries of the ad slot (BLOCK 815). The computing device can present the first content object within the ad slot on the computing device, and responsive to presenting the first content object, receive an action by the user. The computing device can determine a region of the display that the action was initiated. The computing device can then compare if the determined region lies within the region defined within the boundaries of the ad slot.

The computing device can determine that the action corresponds to the first predetermined gesture (BLOCK 820). In some implementations, the computing device can identify if the action corresponds to one or more predetermined gestures. In some implementations, the computing device can identify the action performed by the user responsive to determining that the action was initiated at a region of the display screen that corresponds to the area within the ad slot. In some implementations, the computing device can identify the action based on the input received via the touch screen interface. The computing device can then determine if the action satisfies the criteria associated with one of the predetermined gestures. The criteria can include a location of a starting point of the action, a relative location of an ending point of the action, a speed at which the action was performed, relative locations of one or more other intermediary points during the action, among others. In some implementations, the predetermined gesture can include a right swipe, a left swipe, among others. The computing device can determine that the action corresponds to the first predetermined gesture responsive to determining that the action satisfies the criteria associated with the first predetermined gesture.

The computing device can then provide for display, responsive to determining that the action corresponds to a first predetermined gesture, the second content object instead of the first content object (BLOCK 825). In some implementations, the second content object can be displayed in a second ad slot. In some implementations, the computing device can display the second content object within a floating slot provided as an overlay on top of the information resource. In some implementations, the floating ad can include an object to close the floating ad. In some implementations, the floating ad can define boundaries and responsive to receiving an action within the boundaries of the floating ad, the computing device can direct the user to a landing page to which the floating ad is linked. In directing the user to a landing page, the computing device can load an information resource corresponding to the landing page or deploy one or more applications. In some implementations, the mobile application can execute one or more actions on the computing device in response to receiving a qualifying action on the second content object. In some implementations, the second content object can include one or more icons configured to cause the computing device to perform different tasks. For instance, the second content object can include a camera icon configured to launch a camera application on the computing device, a messaging icon configured to launch a messaging application on the computing device, and a phone icon configured to launch a phone application on the computing device.

In some implementations, the computing device can, in response to determining that the action corresponds to a second predetermined gesture instead of the first predetermined gesture, remove the first content object from the display screen. In some implementations, the computing device can, in response to determining that the action corresponds to a second predetermined gesture, remove the ad slot from the displayed information resource and adjust a position of at least a portion of the primary content of the information resource to be displayed in a region of the information resource previously occupied by the ad slot.

In some implementations, the computing device can, in response to determining that the action corresponds to a second predetermined gesture, remove from display the first content object and provide a first content object of a second interactive advertisement. As described above, the computing device can receive a plurality of interactive ads responsive to a request for an ad. The computing device can, in response to determining that the action corresponds to a second predetermined gesture, remove from display the first content object and select, for display, a second interactive ad. The computing device can then access the second interactive ad and display the first content object of the second interactive ad in the ad slot.

In some implementations, the computing device can, in response to determining that the action corresponds to a second predetermined gesture, provide, for display, in the ad slot, a content item including a plurality of selectable options. The computing device can then receive a selection of one of the selectable options. The computing device can then provide information to an advertisement selection system. The information can be used for selecting subsequent advertisements for display on the computing device.

Figure 9:
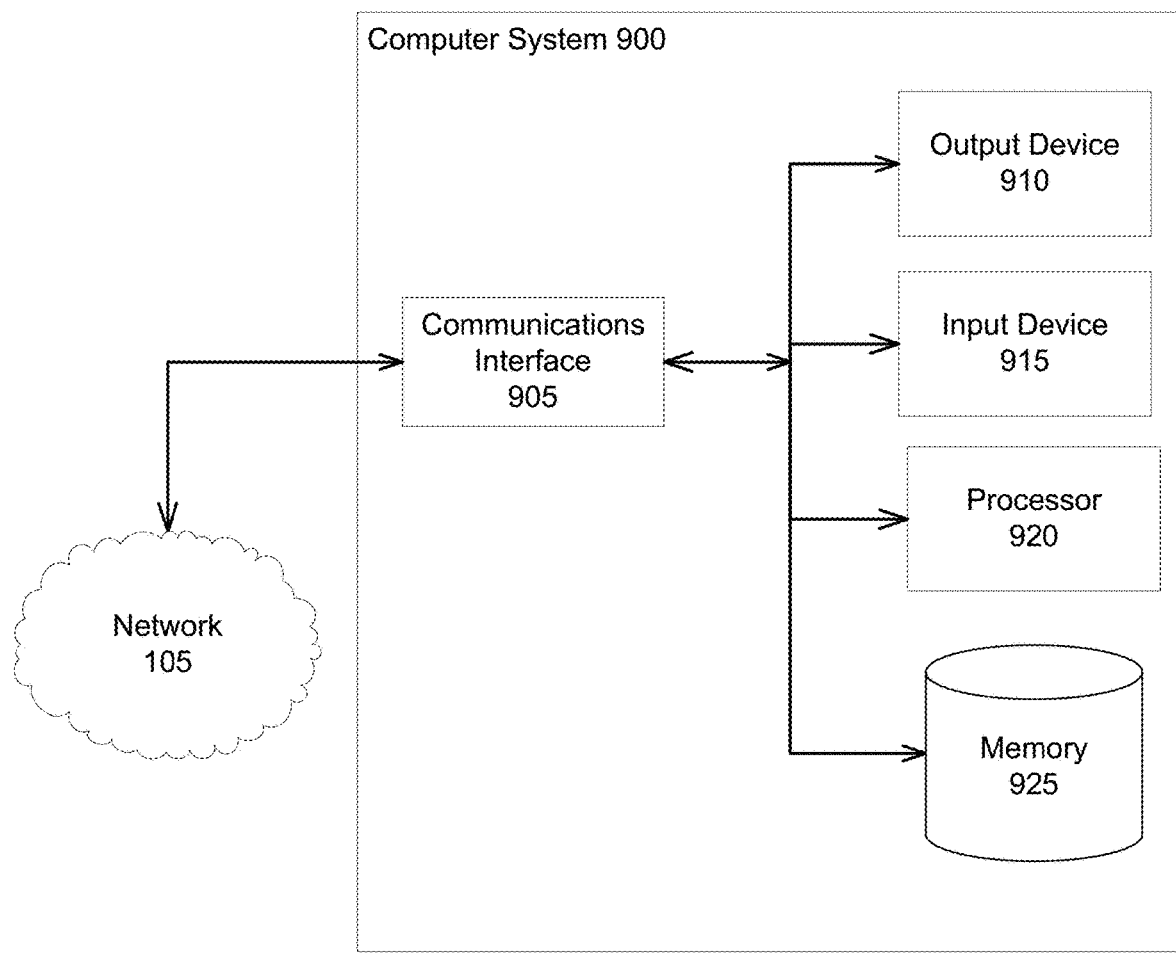
FIG. 9 is a block diagram illustrating a general architecture for a computer system that may be employed to implement elements of the systems and methods described and illustrated herein, according to an illustrative implementation.

FIG. 9 shows the general architecture of an illustrative computer system 900 that may be employed to implement any of the computer systems discussed herein (including the system 110 and its components such as the interactive advertisement generation module 130 and the advertisement selection module 135) in accordance with some implementations. The computer system 900 can be used to provide information via the network 105 for display. The computer system 900 of FIG. 9 comprises one or more processors 920 communicatively coupled to memory 925, one or more communications interfaces 905, and one or more output devices 910 (e.g., one or more display units) and one or more input devices 915. The processors 920 can be included in the data processing system 110 or the other components of the system 110 such as the interactive advertisement generation module 130 and the advertisement selection module 135.

In the computer system 900 of FIG. 9, the memory 925 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 110 of FIG. 1, the data processing system 110 can include the memory 925 to store information related to the availability of inventory of one or more content units, reservations of one or more content units, among others. The memory 925 can include the database 145. The processor(s) 920 shown in FIG. 9 may be used to execute instructions stored in the memory 925 and, in so doing, also may read from or write to the memory various information processed and or generated pursuant to execution of the instructions.

The processor 920 of the computer system 900 shown in FIG. 9 also may be communicatively coupled to or control the communications interface(s) 905 to transmit or receive various information pursuant to execution of instructions. For example, the communications interface(s) 905 may be coupled to a wired or wireless network, bus, or other communication means and may therefore allow the computer system 900 to transmit information to or receive information from other devices (e.g., other computer systems). While not shown explicitly in the system of FIG. 1, one or more communications interfaces facilitate information flow between the components of the system 90. In some implementations, the communications interface(s) may be configured (e.g., via various hardware components or software components) to provide a website as an access portal to at least some aspects of the computer system 900. Examples of communications interfaces 905 include user interfaces (e.g., web pages), through which the user can communicate with the data processing system 90.

The output devices 910 of the computer system 900 shown in FIG. 9 may be provided, for example, to allow various information to be viewed or otherwise perceived in connection with execution of the instructions. The input device(s) 915 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The features disclosed herein may be implemented on a smart television module (or connected television module, hybrid television module, etc.), which may include a processing module configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device. A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top level screen including icons for a plurality of different applications, such as a web browser and a plurality of streaming media services, a connected cable or satellite media source, other web "channels", etc. The smart television module may further be configured to provide an electronic programming guide to the user. A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. The interactive advertisement generation module 130 and the advertisement selection module 135 can include or share one or more data processing apparatuses, computing devices, or processors.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 900 or system 110 can include clients and servers. For example, the data processing system 110 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the interactive advertisement generation module 130 and the advertisement selection module 135 can be part of the data processing system 110, a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to detecting device or carrier change conversions based on device information and carrier information that is received with requests to provide content to communication devices, the systems and methods described herein can be applied to other environments in which data included in a request for content is used and compared to data corresponding to previous requests for content and responsive to determining a change in the data, identifying one or more content items to which to attribute the credit for the change. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A method for reducing inadvertent interactions on content items, comprising:
    receiving, on a computing device including one or more processors, an interactive content item comprising a first content object corresponding to a collapsed version of the interactive content item and a second content object corresponding to an expanded version of the interactive content item;
    displaying the first content object corresponding to the collapsed version of the interactive content item at a first location of a display of the computing device;
    receiving, by the computing device, a first action on the first content item;
    determining, by the computing device, that the first action corresponds to a predefined action;
    providing, responsive to determining that the first action corresponds to the predefined action, a graphical object for display at a second location on the display of the computing device, the second location different than the first location and representing a location towards which to move the first content object to cause the computing device to display the second content object;
    receiving, by the computing device, a second action to move the first content object towards the graphical object; and
    providing for display, responsive to determining that the second action to move the first content object towards the graphical object satisfies a triggering event, the second content object corresponding to the expanded version of the interactive content item on the display of the computing device.

2. The method of claim 1, wherein the first action corresponds to a touch on a display screen and the second action corresponds to one of a drag or swipe gesture.

3. The method of claim 1, wherein the first action corresponds to one of a touch for a time period greater than a predetermined length of time or a double-tap.

4. The method of claim 1, wherein providing, for display, the graphical object to which to move the first content object includes:
    determining at least one coordinate pair of pixels corresponding to a first edge of the first content object and an identity of the first edge of the first content object; and
    determining, based on the at least one coordinate pair of pixels and the first edge of the first content object, a second coordinate pair at which to position a second edge of the graphical object.

5. The method of claim 1, wherein displaying the graphical object includes displaying the graphical object in a first appearance when a distance from a first edge of the first content object to a corresponding edge of the graphical object is greater than a predetermined distance and displaying the graphical object in a second appearance when the distance from the first edge of the first content object to the corresponding edge of the graphical object is less than a predetermined distance from the corresponding edge of the graphical object.

6. The method of claim 1, further comprising:
    receiving, via the display of the computing device, an input indicative of initiating the second action to move the first content object from the first location towards the graphical object;
    providing, for display, a visual indicator indicating that the expanded version of the interactive content item will be displayed on the display of the computing device upon terminating the second action.

7. The method of claim 1 further comprises, responsive to receiving the second action to move the first content object towards the graphical object, increasing an opacity of an overlay provided over an information resource displayed on the computing device.

8. The method of claim 1, further comprises determining the second location to position the graphical object based on at least one of a size of the first content object, the first location of the first content object on the display, a size of the graphical object and a size of the display.

9. The method of claim 1, further comprising providing, for display, a call to action indicating a manner in which to expand the collapsed version of the content item to the expanded version of the content item.

10. A method for reducing inadvertent interactions on content items, comprising:
    receiving, by a data processing system including one or more processors, a request to display, on a display of a computing device, content in an ad slot of an information resource;
    providing, for display, by the data processing system, an interactive content item in response to the request to display content, the interactive content item including a first content object corresponding to a collapsed version of the interactive content item, a second content object corresponding to an expanded version of the interactive content item, and a script executable by one or more processors of the computing device, the script configured to cause one or more processors of the computing device to:
display, on the display of the computing device, the first content object corresponding to the collapsed version of the interactive content item at a first location of the display of the computing device;
receive a first action on the first content item;
determine that the first action corresponds to a predefined action;
provide for display, responsive to determining that the first action corresponds to a predefined action, a graphical object for display at a second location on the display of the computing device, the second location different than the first location and representing a location towards which to move the first content object to cause the computing device to display the second content object;
receive, by the computing device, a second action to move the first content object towards the graphical object; and
provide for display, responsive to determining that the second action to move the first content object towards the graphical object satisfies a triggering event, the second content object corresponding to the expanded version of the interactive content item on the display of the computing device.

11. The method of claim 10, wherein the first action corresponds to a touch on a display screen and the second action corresponds to a swipe gesture.

12. The method of claim 10, wherein the first action corresponds to a touch for a time period greater than a predetermined length of time or a double tap.

13. The method of claim 10, wherein to provide, for display, the graphical object to which to move the first content object, the script of the interactive content item configured to cause the one or more processors of the computing device to:
determine at least one coordinate pair of pixels corresponding to a first edge of the first content object and an identity of the first edge of the first content object; and
determine, based on the at least one coordinate pair of pixels and the first edge of the first content object, a second coordinate pair at which to position a second edge of the graphical object.

14. The method of claim 10, wherein the script of the interactive advertisement is further configured to cause the one or more processors of the computing device to:
display the graphical object in a first appearance responsive to determining that a distance from a first edge of the first content object to a corresponding edge of the graphical object is greater than a predetermined distance; and
display the graphical object in a second appearance responsive to determining that the distance from the first edge of the first content object to the corresponding edge of the graphical object is less than a predetermined distance from the corresponding edge of the graphical object.

15. The method of claim 10, wherein the script of the interactive advertisement is further configured to cause the one or more processors of the computing device to:

receive, via the display of the computing device, an input indicative of initiating the second action to move the first content object from the first location towards the graphical object;
provide, for display, a visual indicator indicating that the expanded version of the interactive content item will be displayed on the display of the computing device upon terminating the second action.

16. The method of claim 10, wherein responsive to receiving the second action to move the first content object towards the graphical object, the script of the interactive content item is further configured to cause the one or more processors of the computing device to increase an opacity of an overlay provided over the information resource.

17. The method of claim 10, wherein the script of the interactive content item is further configured to cause the one or more processors of the computing device to determine the second location to position the graphical object based on at least one of a size of the first content object, a current location of the first content object on the display, a size of the graphical object and a size of the display.

18. The method of claim 10, wherein the script of the interactive content item is further configured to cause the one or more processors of the computing device to provide, for display, a call to action indicating a manner in which to expand the collapsed version of the content item to the expanded version of the content item.

19. The method of claim 10, wherein the script of the interactive content item is configured to call a library function stored in a browser executing on the computing device.

20. A system for reducing inadvertent interactions on content items, comprising:
a computing device including one or more processors, a memory and a display, the computing device configured to
receive an interactive content item comprising a first content object corresponding to a collapsed version of the interactive content item and a second content object corresponding to an expanded version of the interactive content item;
display the first content object corresponding to the collapsed version of the interactive content item at a first location of a display of the computing device;
receive a first action on the first content item;
determine that the first action corresponds to a predefined action;
provide for display, responsive to determining that the first action corresponds to a predefined action, a graphical object for display at a second location on the display of the computing device, the second location different than the first location and representing a location towards which to move the first content object to cause the computing device to display the second content object;
receive, a second action to move the first content object towards the graphical object; and
provide for display, responsive to determining that the second action to move the first content object towards the graphical object satisfies a triggering event, the second content object corresponding to the expanded version of the interactive content item on the display of the computing device.

* * * * *